US012667981B2

(12) United States Patent

Angerer et al.

(10) Patent No.: US 12,667,981 B2

(45) Date of Patent: Jun. 30, 2026

(54) GRIPPING DEVICE HAVING MOVABLE SLIDES

(71) Applicant: TRUMPF Maschinen Austria GmbH & Co. KG., Pasching (AT)

(72) Inventors: Gerhard Angerer, Altenberg (AT); Michael Schernhammer, Leonding (AT); Klemens Freudenthaler, Linz (AT); Florian Maier, Leonding (AT); Nenad Kovjenic, Linz (AT); Florian Hausmann, Traun (AT); Verena Steininger, Linz (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 406 days.

(21) Appl. No.: 18/281,402

(22) PCT Filed: Mar. 25, 2022

(86) PCT No.: PCT/AT2022/060093

§ 371 (c)(1),
(2) Date: Sep. 11, 2023

(87) PCT Pub. No.: WO2022/198256

PCT Pub. Date: Sep. 29, 2022

(65) Prior Publication Data

US 2024/0149469 A1    May 9, 2024

(30) Foreign Application Priority Data

Mar. 26, 2021    (AT) .................................. 50215/2021

(51) Int. Cl.
B25J 15/06        (2006.01)
B65G 47/91        (2006.01)

(52) U.S. Cl.
CPC ........ B25J 15/0616 (2013.01); B65G 47/918 (2013.01)

(58) Field of Classification Search
CPC .... B25J 15/0616; B65G 47/918; B25B 11/00; B25B 11/005; B23Q 3/06; B23Q 3/068; B23Q 3/082
See application file for complete search history.

(56) References Cited

U.S. PATENT DOCUMENTS

| | | | |
|---|---|---|---|
| 4,228,993 A | 10/1980 | Cathers | |
| 6,349,912 B1 | 2/2002 | Schauss et al. | |

(Continued)

FOREIGN PATENT DOCUMENTS

| | | |
|---|---|---|
| CN | 105742224 A | 7/2016 |
| CN | 106826893 A | 6/2017 |

(Continued)

OTHER PUBLICATIONS

International Search Report in PCT/AT2022/060093, mailed Aug. 4, 2022.

*Primary Examiner* — Lee D Wilson
(74) *Attorney, Agent, or Firm* — Collard & Roe, P.C.

(57)        ABSTRACT

A gripping device includes a supporting platform with a connection interface for coupling to a manipulator and at least two adjustment-slide guides. The gripping device includes a supply device for activating and deactivating the retaining elements. At least two adjustment slides are each at least partially received or supported in at least one adjustment-slide guide and are slidable relative to the platform along a first direction in the adjustment-slide guides. At least one adjustment slide has at least one transverse guide on which at least one retaining element is arranged. The transverse slide is at least partially received or supported in the transverse guide and is slidable relative to the adjustment slide along a second direction in the transverse guide (Continued)

Figure 1:
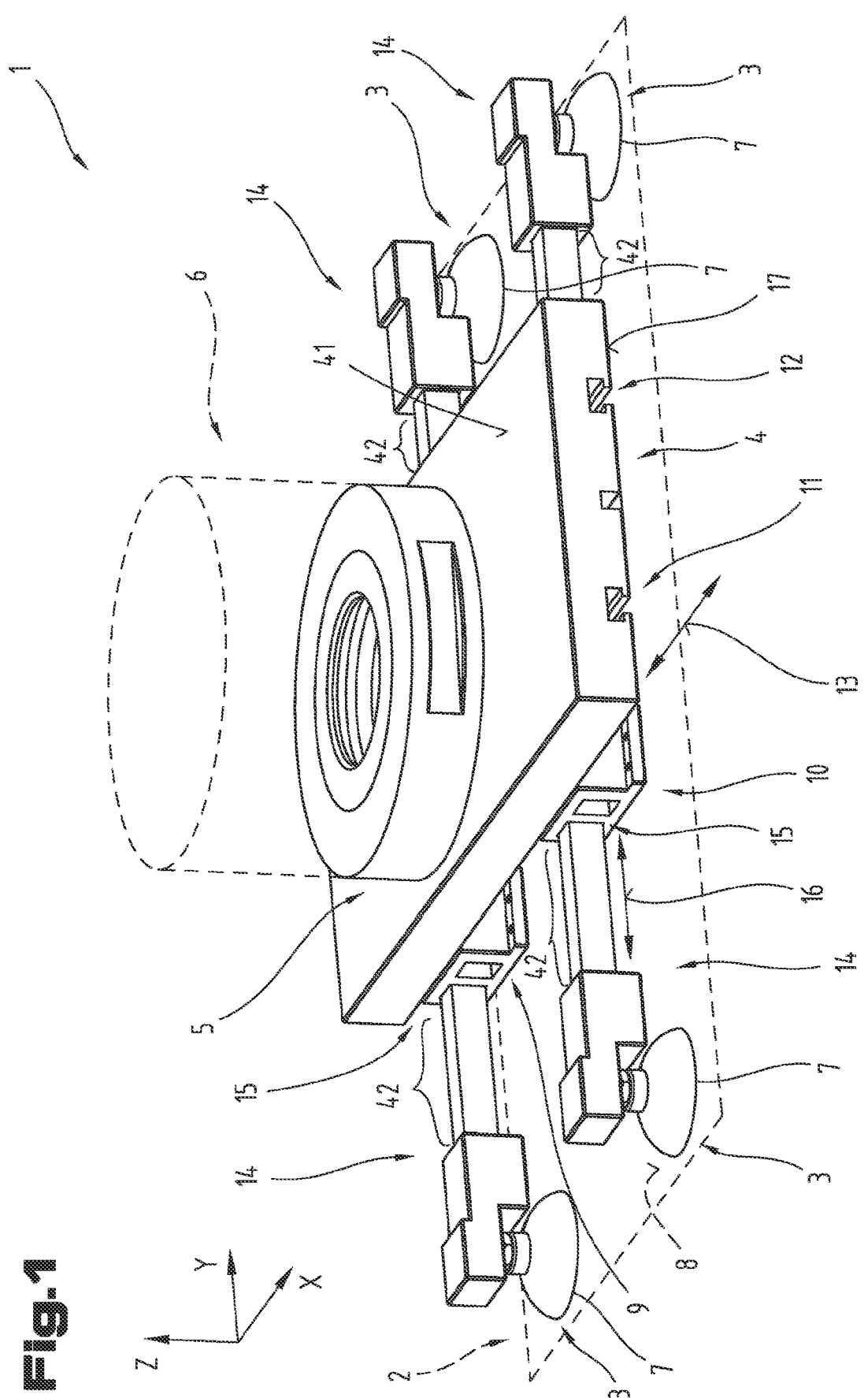

orthogonal to the first direction. A guide section of the at least one transverse slide is profiled and is received or supported and linearly extendable therein.

19 Claims, 13 Drawing Sheets

(56) References Cited

U.S. PATENT DOCUMENTS

| | | |
|---|---|---|
| 6,796,588 B2 | 9/2004 | Hsieh |
| 8,734,083 B2 | 5/2014 | Negre et al. |
| 10,040,202 B2 | 8/2018 | Alonso Ramila et al. |
| 10,654,174 B2 | 5/2020 | Eidelberg et al. |
| 11,167,425 B2 | 11/2021 | Eidelberg et al. |
| 11,358,810 B2 | 6/2022 | Stauffer et al. |
| 11,447,338 B2 * | 9/2022 | Sighinolfi ............ B25B 11/007 |
| 2016/0160526 A1 * | 6/2016 | Allen .................... B21D 31/02 |
| | | 29/243.5 |
| 2017/0368692 A1 * | 12/2017 | Alonso Ramila .... B25J 15/0061 |
| 2020/0139560 A1 | 5/2020 | Eidelberg et al. |
| 2021/0002086 A1 | 1/2021 | Stauffer et al. |
| 2024/0149469 A1 * | 5/2024 | Angerer .............. B25J 19/0025 |

FOREIGN PATENT DOCUMENTS

| | | | |
|---|---|---|---|
| CN | 208867201 U | 5/2019 |
| CN | 110977582 A | 4/2020 |
| CN | 210335998 U | 4/2020 |
| DE | 10 2013 105 383 B3 | 7/2014 |
| EP | 0 512 126 A1 | 11/1992 |
| EP | 1 041 295 B1 | 9/2004 |
| EP | 1 871 696 B1 | 6/2008 |
| EP | 2 401 118 B1 | 6/2013 |
| EP | 2 712 689 A1 | 4/2014 |
| EP | 3 031 586 A1 | 6/2016 |
| JP | S59-157806 U | 10/1984 |
| JP | H02-139086 U | 11/1990 |
| JP | H03-122069 U | 12/1991 |
| JP | 2017-109283 A | 6/2017 |
| KR | 20110126819 A | 11/2011 |
| WO | 2006/089327 A1 | 8/2006 |
| WO | 2010/097098 A1 | 9/2010 |
| WO | 2011/059167 A1 | 5/2011 |
| WO | 2016/069731 A1 | 5/2016 |
| WO | 2019/166097 A1 | 9/2019 |

* cited by examiner

GRIPPING DEVICE HAVING MOVABLE SLIDES

CROSS REFERENCE TO RELATED APPLICATIONS

This application is the National Stage of PCT/AT2022/060093 filed on Mar. 25, 2022, which claims priority under 35 U.S.C. § 119 of Austrian Application No. A 50215/2021 filed on Mar. 26, 2021, the disclosure of which is incorporated by reference. The international application under PCT article 21(2) was not published in English.

The invention relates to an adjustable gripping device, and to a manipulator with an adjustable gripping device.

Known from the prior art to those working in the field are adjustable and/or readjustable gripping devices which are to enable a position adjustment of retaining means, in particular of vacuum-actuated retaining means. The position adjustment of the retaining means is to enable a manipulation of workpieces of different sizes. In this context, an adjustable gripping device has become known from EP 3031586 A1, for example. Here, stationary arms with guide rails, having multiple transverse arms displaceable along the guide rails, are provided, wherein slidable retaining means are arranged on the slidable transverse arms. EP 1041295 B1 discloses a supporting device with profiled rods, which rods are releasably connected to one another via slidable clamping pieces. EP 1871696 B1, which originates from the applicant, shows a gripping device for a manipulator with multiple support arms rotatable about an axis. The support arms comprise a base arm and a cantilever arm, on each of which retaining means are positioned. U.S. Pat. No. 6,796,588 B2 discloses a suction device with telescopic evacuating pipes, comprising a cantilever and multiple glide pieces, which can be moved along the cantilever.

However, the embodiments known in the prior art are only slightly compact in structure, not sufficiently flexible, and, in addition, not, or not sufficiently, adjustable to different workpiece geometries. Furthermore, the known solutions are structurally complex and only slightly stable and/or slightly robust and therefore essentially not suited for handling heavy components, or they are characterized by a short lifetime.

It was the object of the present invention to make available means by means of which workpieces, in particular plate-like workpieces or sheet-metal components, of different forms and sizes can be manipulated with a single gripping device that can be adjusted in a flexible, simple and precise manner Here, the gripping device is to be configured both robust and stable, and low in structural complexity, compact, durable and safe to handle.

This object is achieved by means of an adjustable gripping device and by a manipulator in accordance with the claims.

The invention relates to a gripping device, which is configured for receiving a, preferably plate-like, workpiece to be transported, and for releasing it again. To that end, the gripping device comprises a supporting platform with a bottom side and with a top side located opposite the bottom side. The supporting platform is configured, on its top side, with a connection interface, which is configured for coupling the gripping device to a manipulator. In addition, the supporting platform is configured with at least two adjustment-slide guides on its bottom side.

In addition, the gripping device comprises a plurality of retaining means for retaining the workpiece. The retaining means are coupled to the supporting platform, wherein a coupling can be done directly or indirectly. Furthermore, the coupling can be done preferably releasably, particularly preferably so as to be releasable without tools. Each of the retaining means has contact sides, which contact sides face away from the bottom side of the supporting platform and which tenter a joint contact plane. The skilled person is familiar with different kinds of retaining means, which is why these will not be described in detail here. For example, the retaining means can be suction-cup-like, vacuum-actuatable retaining means. Alternatively, also magnetically-acting retaining means are conceivable, wherein both pressure-actuatable permanent magnets and retaining means with electromagnets can be used.

The gripping device also comprises supply means, which are configured for activating and deactivating the retaining means. Depending on the kind and operating mechanism of the retaining means, the supply means may be, for example, components of a vacuum supply (such as, for example, an aggregate, flexible vacuum tubes, rigid vacuum pipes, valves, valve shut-offs, valve islands, etc.), or components of a power supply (such as, for example, an aggregate, electrical lines, etc.).

The gripping device further comprises at least two slidable adjustment slides. Each of these adjustment slides is at least partially received or supported in at least one of the adjustment-slide guides of the supporting platform. Furthermore, the adjustment slides are slidable relative to the supporting platform along a first direction in these adjustment-slide guides. The first direction will also be referred to as x-direction below. At least one of the adjustment slides is configured having at least one transverse guide. The gripping device also comprises at least one transverse slide, on which at least one of the retaining means is arranged. The transverse slide is at least partially received or supported in the transverse guide and is slidable relative to the adjustment slide along a second direction in the transverse guide. The second direction will also be referred to as y-direction below. The first direction and the second direction are mutually orthogonal. Preferably, the first and the second direction run parallel to the contact plane, wherein the contact plane can run parallel to the x-y-plane.

In accordance with the invention, it is provided that a guide section of the at least one transverse slide, which guide section is received or supported in the at least one transverse guide, is profiled, in particular hollow-profiled. Here, this guide section is linearly extendable and/or linearly retractable in the transverse guide.

The profiled guide section of the at least one transverse slide can be circular, rectangular, or also oval, for example. Generally, also a dovetailed cross section can optionally be expedient.

As already mentioned, the retaining means can be positioned both at the transverse guide(s) and additionally also on the adjustment slides, and also directly on the supporting platform. Generally, the actual positioning, and also size and number, of the retaining means are at the discretion of the skilled person. Here, in particular the retaining means positioned on the push-out transverse slides are characterized by a slidability in two dimensions, i.e. in x and y-direction. Preferably, individual adhesive means can be activated and deactivated individually and independent of one another as required. To that end, a manually-actuatable, or also automatically-actuatable, shut-off valve can be provided, for example in a supply line of the respective retaining means.

The at least two adjustment slides and the at least one transverse slide can be manually slidable by an operator. Yet, alternatively, also an automatic, in particular pneumatic or also electrical, slidability and/or adjustability of the slides is conceivable. Sliding and adjustment parameters can be provisioned to an operator preferably by means of a software-based set-up plan. Preferably, both the adjustment-slide guide and also the at least one transverse guide can be configured as linear guides. Such a construction is both producible at low cost and also simple to operate, yet without sacrificing any freedom of movement, due to the slidability of the retaining means in two directions.

In comparison to known constructions, the gripping device configured in accordance with the invention is both structurally simple and therefore low in cost, and also robust and therefore durable and requiring little repair. Furthermore, the gripping device can be pushed together so as to be particularly compact, and the distance between the individual retaining means can therefore be adjusted so as to be extremely small. This applies in particular whenever the at least one linearly-extendable transverse guide is completely retracted. Such an adjustment can be advantageous in particular in very small workpieces, or also in angled-off and/or beveled workpieces. On the other hand, the ability of the at least one transverse slide to be pushed out also enables the retaining means to be spaced far apart from one another. In particular, the flexible slidability and adjustability also ensures that a danger of collisions with the manipulator, and also with peripheral objects, is prevented, or at least essentially impeded.

The sliding of the slides along the guides can be carried out in a simple manner and does not require a great deal of time. The gripping device and/or the retaining means positioned on the gripping device can thus be flexibly adjusted to the respective geometry of the workpiece to be manipulated. A plurality of workpiece dimensions can be manipulated with only a single but flexibly-adjustable gripping device. As the adjustability is particularly simple and can therefore also be done by less well-trained set-up personnel, the set-up times can be cut considerably. In particular in case of a low number of the workpieces to be manipulated, this can have positive economic effects.

Further, it may be expedient if at least one of the adjustment slides is configured with two parallel transverse guides, and if an extendable transverse slide is received or supported in each transverse guide, wherein at least one of the retaining means is arranged on each transverse slide. Here, the retaining means are configured on end sections of the two transverse slides facing away from each other. When extending both transverse slides, the respective retaining means are not only spaced further apart from the adjustment slide, but also the distance between the two retaining means is increased. A maximum push-out distance can thus be realized in a simple manner. The two transverse slides thus represent a possibility to extend the adjustment slide on both sides along the second direction, thus enabling an even more flexible adjustability. If the retaining means are arranged on the end sections of the respective transverse slides, this ensures that a minimum projection can be realized in the retracted state and a maximum projection can be realized in the completely extended state.

Due to the configuration of the retaining means on end sections of the two transverse slides facing away from each other and/or due to the exterior arrangement of the retaining means, viewed from the bottom side of the supporting device, the surface tentered by the suckers does not create any additional interfering contour. This can be advantageous in order to be able to move the gripping device close to a machine, in particular to a bending tool of a bending machine. For example, it may be that, in case of box-like components in which the base area does not project beyond a minimum gripper setting, for example, a readjusting is not required.

In addition, also the height of the gripping device can be designed such that it may be possible to move as closely as possible, also into a tight area, for example above a tool tray. This can also be enabled or facilitated by coupling the retaining means to a transverse slide, or also to an adjustment slide, by means of L-shaped and/or bent connection means.

In accordance with one advantageous advancement, it can be provided that a transverse axis oriented along the first direction is located equidistantly between the two parallel transverse guides. Here, the retaining means arranged on the two transverse slides are positioned such that the retaining means are located on the transverse axis with their respective retaining means centers. In other words and in accordance with this advancement, the retaining means located opposite each other are inclined to each other, viewed from the bottom side of the supporting platform, such that their retaining means centers are located on the transverse axis. Therefore, the retaining means, viewed from the gripping device in a direction of its bottom side, are positioned offset relative to the respective guide section. This ensures that an accuracy of the adjustability can be additionally increased as a potential mismatch error or offset error can be compensated for due to the parallel arrangement of the two transverse guides and/or of the two transverse slides.

Furthermore, it can be provided that the adjustment slides are each configured with one adjustment-slide fixing means. These adjustment-slide fixing means can be actuated independent of each other and are configured for fixing the adjustment slides relative to the supporting platform, releasably as required. Alternatively or additionally, it can also be advantageous if the adjustment slides are each configured with at least one transverse-slide fixing means. This transverse-slide fixing means is configured for fixing the at least one transverse slide relative to the adjustment slide, releasably as required. Preferably, the fixing means can be actuatable manually, or at least with sparse use of tools. This advancement has an effect that additionally increases safety because a reliable fixability of the slides against inadvertent sliding or misadjusting can considerably reduce any risk of injury for persons, and also a risk of damage to peripheral objects or to the workpieces. This applies in particular in case of heavy workpieces, or workpieces with a non-central center of gravity, or also in case of gripping devices which can be moved and rotated freely in space by means of a manipulator.

Also advantageous is an embodiment in accordance with which it can be provided that at least one first scale is configured on the supporting platform along the first direction. Optionally, also multiple first scales can be provided on the supporting platform. Alternatively or additionally, it can also be advantageous if a second scale is configured on the at least one transverse slide, in particular on its guide section, along the second direction. With the help of the scale markings, a user can carry out adjustments and/or readjustments on the gripping device in a simple and swift manner, and in addition correctly. On the two scales, the respective current setting or position of the adjustment slides and of the at least one transverse slide can be read easily by means of an indicator. In particular if multiple first scales are provided, it can be advantageous if these are scaled in a manner offset by one width of the adjustment slide, whereby a precise adjustability can be ensured.

In accordance with one particular embodiment, it is possible that the first scale and the second scale are arranged parallel to the contact plane, so that they are visible, viewed from the bottom side of the supporting platform. This can considerably facilitate the reading of the current and/or of the new adjustment position of the adjustment slides, and of the at least one transverse slide, for a user. During the adjustment work, the user need not turn or move awkwardly in order to read the scales but is able to make out any and all adjustment parameters when viewing the bottom side of the supporting platform. Furthermore, it may also be that any and all snap-in recesses and/or snap-in holes are visible, viewed from the bottom side. Yet, it may also be that merely the snap-in recesses in the supporting platform are visible when viewing the bottom side of the supporting platform and that the snap-in recesses of the transverse slide are orthogonal to the contact plane. The snap-in recesses of the transverse slide would thus be visible to the observer only when viewing the gripping device from the side. The precise arrangement of the snap-in recesses depends on the snap-in mechanism and is at the discretion of the skilled person.

In one particular embodiment, it is conceivable that the adjustment-slide fixing means is configured as an adjustment-slide snap-in means, and/or that the transverse-slide fixing means is configured as a transverse-slide snap-in means. Here, the supporting platform can be configured with a plurality of snap-in recesses spaced equidistantly apart from one another along the first direction. Preferably, the snap-in recesses are configured, here, in the guide section of the transverse slide. A snap-in element of the adjustment-slide snap-in means can be engageable with the snap-in recesses of the supporting platform. In addition, the transverse slide can be configured with a plurality of snap-in recesses spaced equidistantly apart from one another along the second direction, and a snap-in element of the transverse-slide snap-in means can be engageable with the snap-in recesses of the transverse slide. Preferably, the scale markings of the first and/or of the second scale correspond to the distances of the respective snap-in recesses that are spaced equidistantly apart from one another and/or discrete. This enables a user to carry out adjustments and/or readjustments on the gripping device in a simple and swift manner, and in addition correctly. On the two scales, the respective current setting or position of the adjustment slides and of the at least one transverse slide can be read easily by means of an indicator. Expediently, the snap-in recesses and the respective scale are arranged next to one another, so that a reading of the current adjustment can be done in a simple and, without further aids, precise manner Yet, generally, also a continuous adjustability without snap-in recesses that are spaced equidistantly apart from one another would furthermore be conceivable.

In accordance with one advancement, it is possible that the snap-in element of the adjustment-slide snap-in means and/or the snap-in element of the transverse-slide snap-in means is configured as a bolt, which bolt is engageable with the snap-in recesses of the supporting platform and/or with the snap-in recesses of the transverse slide. Here, the term bolt is to be interpreted merely functionally and is not intended to be structurally limiting. In this context, it comprises any pin-like actuating means that extends along an axis. In particular, a bolt need not necessarily have a circular cross section but can also be oval or rectangular, for example. At the user end of the bolt, a kind of disk-like button or T-shaped handle can be configured, so that a user can actuate the bolt in a swift and safe manner. The bolt can be engageable with the snap-in recesses, preferably in a form-fitting and/or friction-fitting manner. As soon as the bolt is engaged with a snap-in recess, a relative movement and/or a sliding is prevented.

Further, it may be expedient if the bolt is actuatable manually and if the bolt is configured with a spring-loaded mechanism of action, wherein preferably a spring element, in its idle state, is engaged with one of the snap-in recesses by means of a spring force acting in axial direction of the bolt. The bolt is thus in a snapped-in position in the idle state and can be pulled and/or moved out of the respective snap-in recess by a user pulling it against the spring force along a fixing axis of the bolt. Preferably, an adjusting of the adjustment slides and/or of the transverse slide is done with two hands. With the one hand, the operator pulls the bolt out of its idle position, i.e. out of the snap-in recess of the current adjustment position, and slides the adjustment slide and/or the transverse slide to the new adjustment position. The operator can read a reaching of the adjustment position preferably by means of the scales. As soon as the new adjustment position has been reached, the operator lets go of the bolt and/or of the snap-in element, whereby the bolt is placed into the new snap-in recess by an automatic return of the spring to its idle state and is engaged with same there. It may also be that the user must push the bolt into the snap-in recess in order to fix it. This ensures that an inadvertent sliding or relative moving of the adjustment slides and/or of the transverse slide is no longer possible.

Furthermore, it can be provided that the snap-in recesses of the supporting platform and/or the snap-in recesses of the transverse slide are configured as snap-in holes, wherein the bolt is engageable with the snap-in holes in an at least essentially complementary-shape manner.

Further, it can be provided that the snap-in recesses of the supporting platform and/or the snap-in recesses of the transverse slide are formed by a rack with tooth gaps, wherein the bolt is engageable with the tooth gaps in an at least essentially complementary-shape manner. An engagement of the bolt with the tooth gaps can furthermore cause a fixing by friction fit, whereby the fixing can become even more secure. In particular, a configuration of the guide section of the transverse slide as a rack is particularly expedient here.

It has also proven expedient if the adjustment-slide fixing means comprises at least one screw, wherein a clamping force between one of the adjustment slides and the supporting platform is applicable by means of the screw. Alternatively or additionally, it can be provided that the transverse-slide fixing means comprises at least one screw, wherein a clamping force between the at least one transverse slide and one of the adjustment slides is applicable by means of the screw. An adjustment-slide fixing means and/or transverse-slide fixing means acting with one or multiple screw connections can be particularly stable and ensure a high strength. Among other things, also a risk of an inadvertent releasing and accidents associated therewith can thus be reduced.

According to one advancement, it may be that the adjustment-slide fixing means comprises at least one clamping lever, cam lever or tension lever, wherein a clamping force between one of the adjustment slides and the supporting platform is applicable by means of the clamping lever, cam lever or tension lever. Alternatively or additionally, it can be provided that the transverse-slide fixing means comprises at least one clamping lever, cam lever or tension lever, wherein a clamping force between the at least one transverse slide and one of the adjustment slides is applicable by means of the clamping lever, cam lever or tension lever. A combination of a screw connection and a lever-like, manually-actuatable closing mechanism can cause a particularly stable fixing. Among other things, also a risk of an inadvertent releasing and accidents associated therewith can thus be reduced, wherein a quick releasing and adjusting of the adjustment and transverse slides are done at the same time. Here, it may also be that the clamping lever, cam lever or tension lever is configured in combination with a screw.

In accordance with one advancement, the adjustment-slide fixing means and/or the transverse-slide fixing means can comprise a pneumatic fixing means and therefore be pneumatically fixable. A fixing can thus be done in an automated manner. The providing of a pneumatic fixing means enables a fixing to be done more swiftly and option-ally also most precisely and reliably. In addition, a high degree of safety can be ensured by means of a pneumatic fixing of the slides. Here, it may also be that the at least two adjustment slides and the at least one transverse slide are not only pneumatically fixable but are in addition pneumatically slidable in an automated manner.

According to one advantageous advancement, it can be provided that the adjustment-slide guides are configured as prism tracks for a form-fitting engagement with sections of the adjustment slides. Preferably, the adjustment-slide guides are configured as prism tracks for a form-fitting engagement with sections of both adjustment slides. Here, the term section shall mean that not the entire adjustment slide is received or supported in the adjustment-slide guides but merely a part thereof. This part or section can be a type of sliding block, for example. Preferably, each adjustment slide has two such sections and/or sliding blocks, wherein each sliding block is guided in one of the adjustment-slide guides. This can ensure a particularly high stability and precise guidability and/or slidability. The functioning of the two adjustment-slide guides as quasi-rails ensures a very smooth running. This applies in particular whenever the adjustment slides are particularly long, i.e. longitudinally extend along the second direction.

In particular, it may be advantageous if the guide section of the at least one transverse slide is configured, at least in sections, with a hollow profile, which hollow profile is configured as a vacuum canal. Here, the vacuum canal is flow-connected to the supply means and to the at least one retaining means arranged on the transverse slide. Here, the supply means can comprise a vacuum supply module, a valve island and preferably flexible and/or tubular vacuum lines. The valve island can advantageously be arranged on the top side of the supporting platform. Preferably, the guide section of the at least one transverse slide is configured as a hollow profile. Such a hollow profile can define a canal, in particular a vacuum canal, wherein a vacuum pipe can be arranged in the vacuum canal. The vacuum canal can longitudinally extend in the hollow profile along the second direction and be flow-connected to the retaining means arranged on the transverse slide. Expediently, the retaining means is configured as a vacuum retaining means here. The vacuum pipe longitudinally extends preferably in one of the adjustment slides along the second direction. In addition, the vacuum pipe is positioned in the vacuum canal along the second direction so as to be slidable. The vacuum supply module is flow-connected to the one or multiple retaining means via the valve island by means of the vacuum lines and the vacuum pipe.

Advantageously, it may be that at least one spiral supply line is configured, which at least one spiral supply line is provided to apply a vacuum to at least one of the retaining means. Here, the at least one spiral supply line can be arranged on the bottom side of the supporting platform so as to be aligned along the first direction. It has also proven advantageous if the at least one spiral supply line is filled, at least in sections, by the guide section of the at least one transverse slide. The providing of a spiral and/or coiled or helically-spiraling, preferably flexible and/or tubular supply line enables the respective guide sections to serve as quasi-carriers for the supply, for example with a vacuum, for activating and deactivating the retaining means. Here, the spiral form enables an adjusting and/or extending and retracting of the adjustment and transverse slides without additional aids or additional structural components. Further-more, supply lines thus configured can be arranged so as to be space-saving, and a risk of undesired threading or entanglement, or of damage, can be avoided, or even pre-vented. In addition, this enables structurally-complex and/or wear-sensitive sealing elements between mutually telescopi-cally-adjustable hollow profiles to be avoided. Furthermore, spiral supply lines thus arranged are particularly easily accessible for any maintenance and repair.

In accordance with one advancement, it can be provided that the supply means comprise a valve island, which valve island is flow-connected to the retaining means by means of shut-off valves. The valve island can advantageously be arranged on the top side of the supporting platform. The individual valves of the valve island can be flow-connected to respectively one, or optionally also multiple, of the retaining means. Expediently, the one or multiple retaining means can be configured as vacuum retaining means here. The vacuum supply module is flow-connected to the one or multiple retaining means via the valve island. Here, it can be particularly advantageous if the retaining means are activat-able and deactivatable, as required, by means of their associated valves of the valve island. Such a switch-off of individual retaining means can additionally expand the possibilities for using and adjusting the gripping device. Here, the valves arranged on the valve island can be con-figured so as to act mechanically and/or with a spring return mechanism, for example. Preferably, the valves can be supplied with electricity and activated and deactivated by means of a control separately. Such an embodiment can be particularly reliable in operation, in particular also because a potential power cut—in contrast to spring-return valves—is non-critical and/or will not lead to an inadvertent releasing of a workpiece from the retaining means.

Further, it can be provided that another adjustment slide is configured, which comprises a first and a second guide bar. The two guide bars are slidable along the first direction. Here, the adjustment slide is linearly extendable relative to the supporting platform along the first direction by means of the guide bars. Preferably, the guide bars are guided through openings at a front end of the supporting platform or through prism or profile tracks in the supporting platform. Yet, it may also be that the guide bars are arranged on the top side of the supporting platform and/or are guided in guide means posi-tioned on the top side of the supporting platform. This advancement enables the adjustment possibilities of the gripping device to be additionally expanded in a simple manner Preferably, another first scale is also configured on one or both of the guide bars, i.e. a scale which indicates the current adjustment position of the other adjustment slide to a user. Expediently and with a view to saving costs, the other adjustment slide is configured so as to be at least essentially structurally identical with the first and second adjustment slides. Advantageously, it can be provided here that the guide bars of the other adjustment slide are mutually offset such that they do not disturb each other and do not form an undesired additional interfering contour, in particular also in the pulled-in and/or retracted state.

Furthermore, it can be provided that at least one other transverse slide is configured, on which transverse slide at least one of the retaining means is arranged, and which transverse slide is at least partially received or supported in a transverse guide of the other adjustment slide. The transverse slide is slidable relative to the adjustment slide along the second direction in the transverse guide, wherein a guide section of the other adjustment slide, which guide section is received or supported in the at least one transverse guide, is profiled, in particular hollow-profiled, and wherein this guide section is linearly extendable, and/or also linearly retractable again, in the transverse guide. Preferably, any and all adjustment slides and any and all extendable transverse slides of the gripping device that are received or supported in the adjustment slides are structurally identical, or at least essentially structurally identical. This reduces the storage costs and simplifies, sometimes considerably, any maintenance and repair work.

Also advantageous is an embodiment, in accordance with which it can be provided that a vacuum pipe that is linearly extendable relative to the supporting platform is configured parallel to the guide bars, which vacuum pipe is flow-connected to the supply means and to the at least one retaining means arranged on the transverse slide that is arranged on the other adjustment slide. Here, the supply means can also comprise another vacuum pipe, which is arranged in another vacuum canal in the preferably hollow-profiled guide bars. Alternatively, the other vacuum pipe can be arranged in the supporting platform and parallel to the guide bars. Preferably, the other vacuum pipe is positioned between the guide bars, viewing the supporting platform from the bottom side. The other vacuum pipe is arranged on the other adjustment slide, wherein the retaining means arranged on the other transverse slide is flow-connected to a valve island and/or to a vacuum supply module by means of a preferably flexible-form vacuum line and by means of the other vacuum pipe.

In accordance with one advantageous advancement, it can be provided here that the at least one spiral supply line is filled, at least in sections, by at least one of the guide bars of the adjustment slides, or that the at least one spiral supply line is arranged between the two guide bars.

It can also be provided that at least one energy chain mounted so as to be movable along the first direction is configured, which energy chain is configured for sliding the adjustment slides and/or for sliding the guide bars, and that at least one, preferably flexible and/or tubular, vacuum line is guided in the energy chain. The configuration of an energy chain for sliding the adjustment slides or guide bars enables a more precise slidability and/or adjustability. Energy chains are also known as cable carriers, cable chains or drag chains to those working in the art. Such an arrangement can be structured so as to be movable with particular precision and in addition also relatively space-saving. Furthermore, this embodiment ensures that a spiral supply line is well-protected against damage.

Independent of this, the object of the invention is also achieved by a manipulator, which is configured for receiving a, preferably plate-like, workpiece to be transported, and for releasing it again. The manipulator comprises a gripping device, which is configured according to any one of the claims.

The embodiments and advantages of such a manipulator have already been sufficiently set out in the above passages of the description, which is why reference is made to these passages in this context.

For the purpose of better understanding of the invention, it will be elucidated in more detail by means of the figures below.

Figure 2:
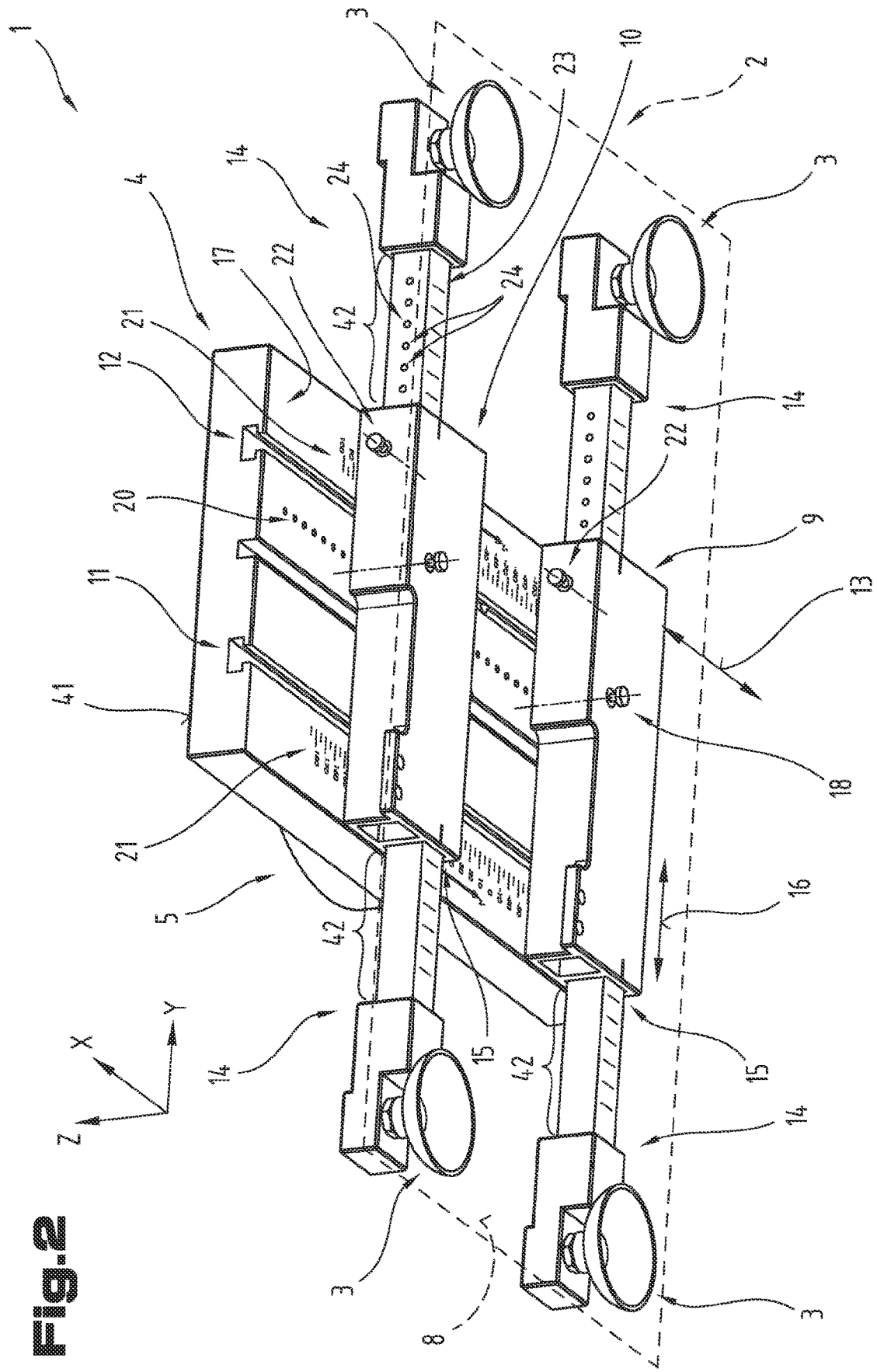
Figure 3:
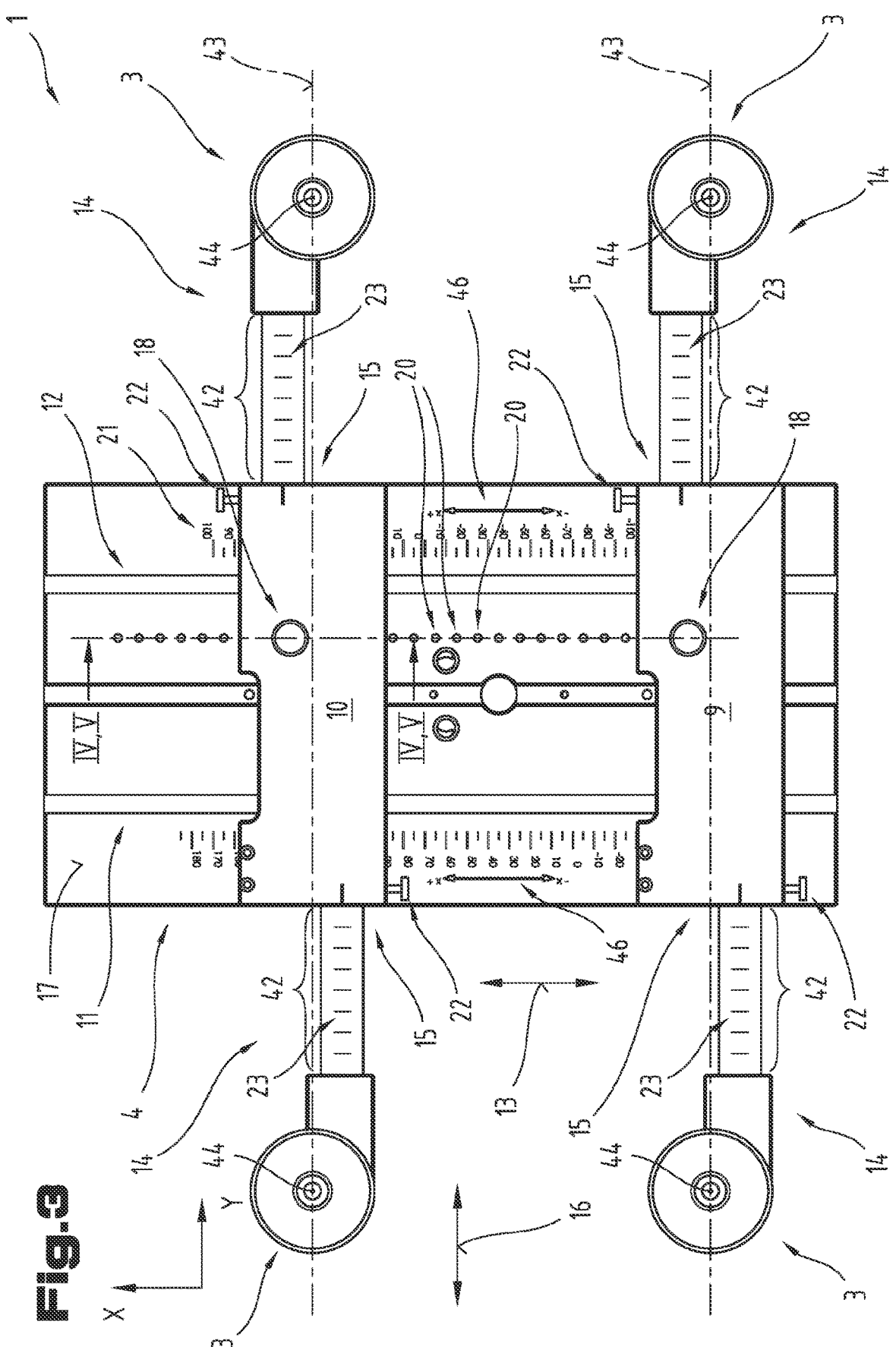
Figure 4:
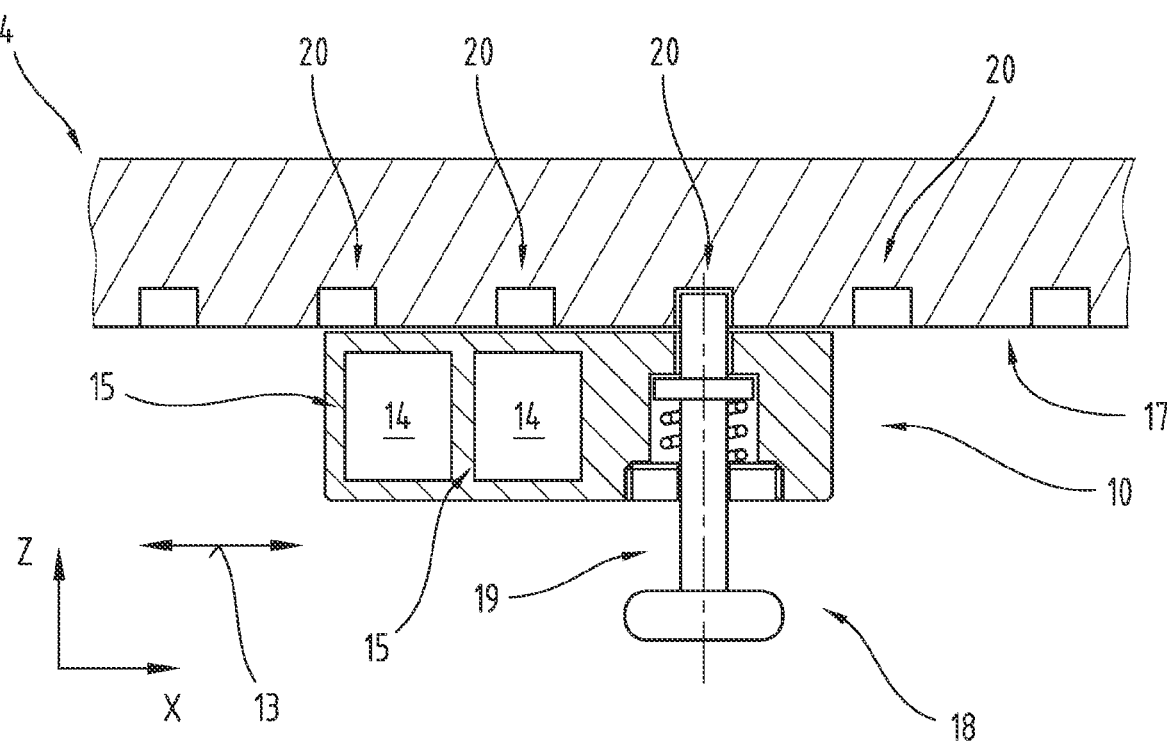
Figure 5:
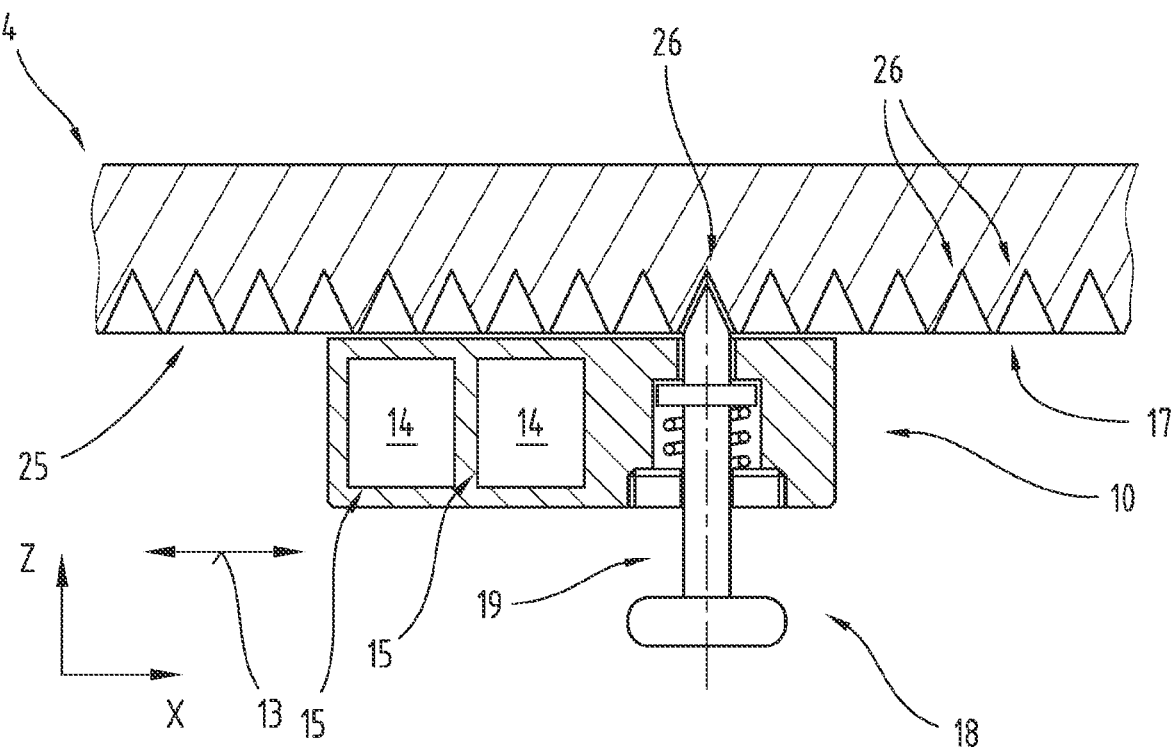
Figure 6:
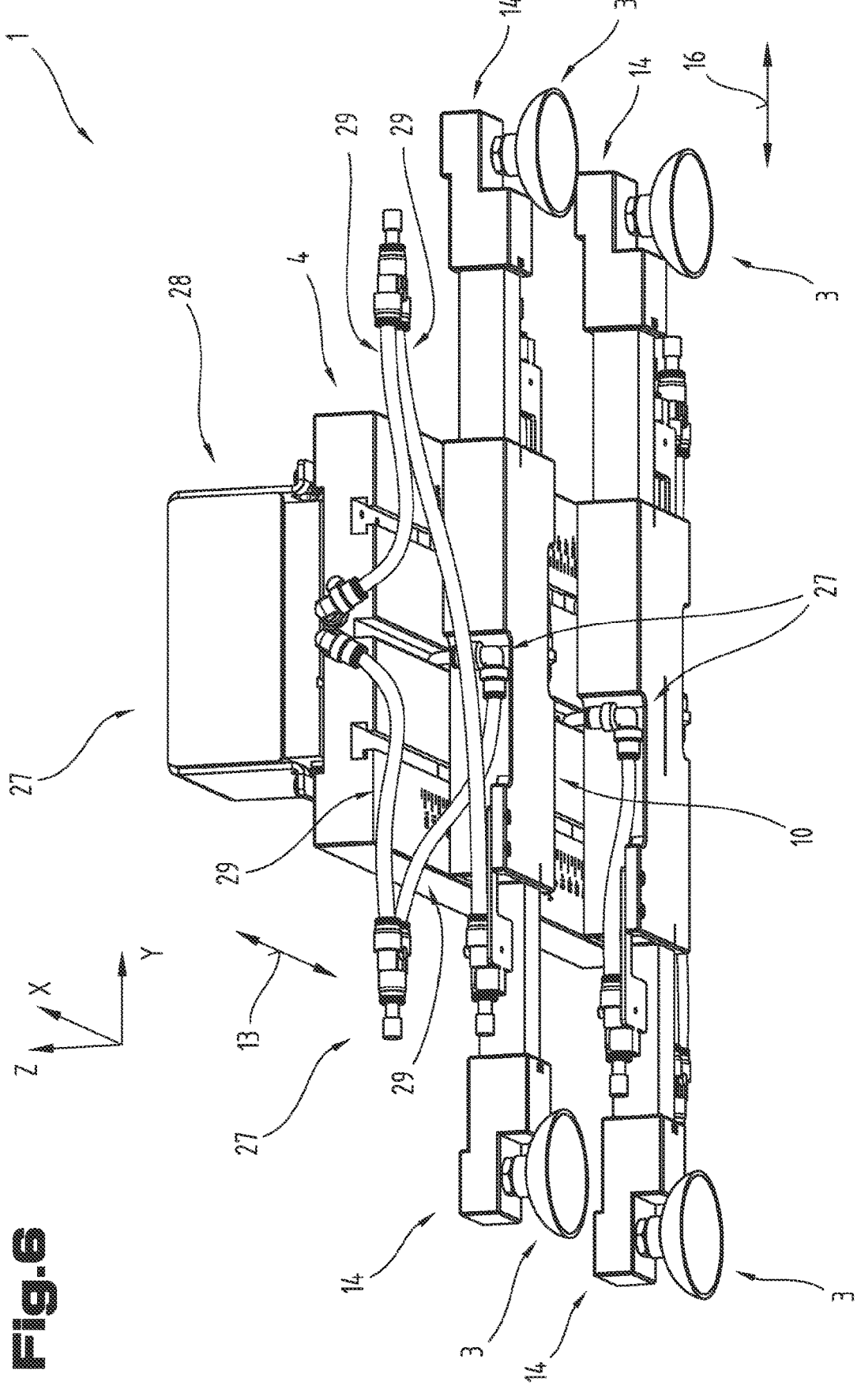
Figure 7:
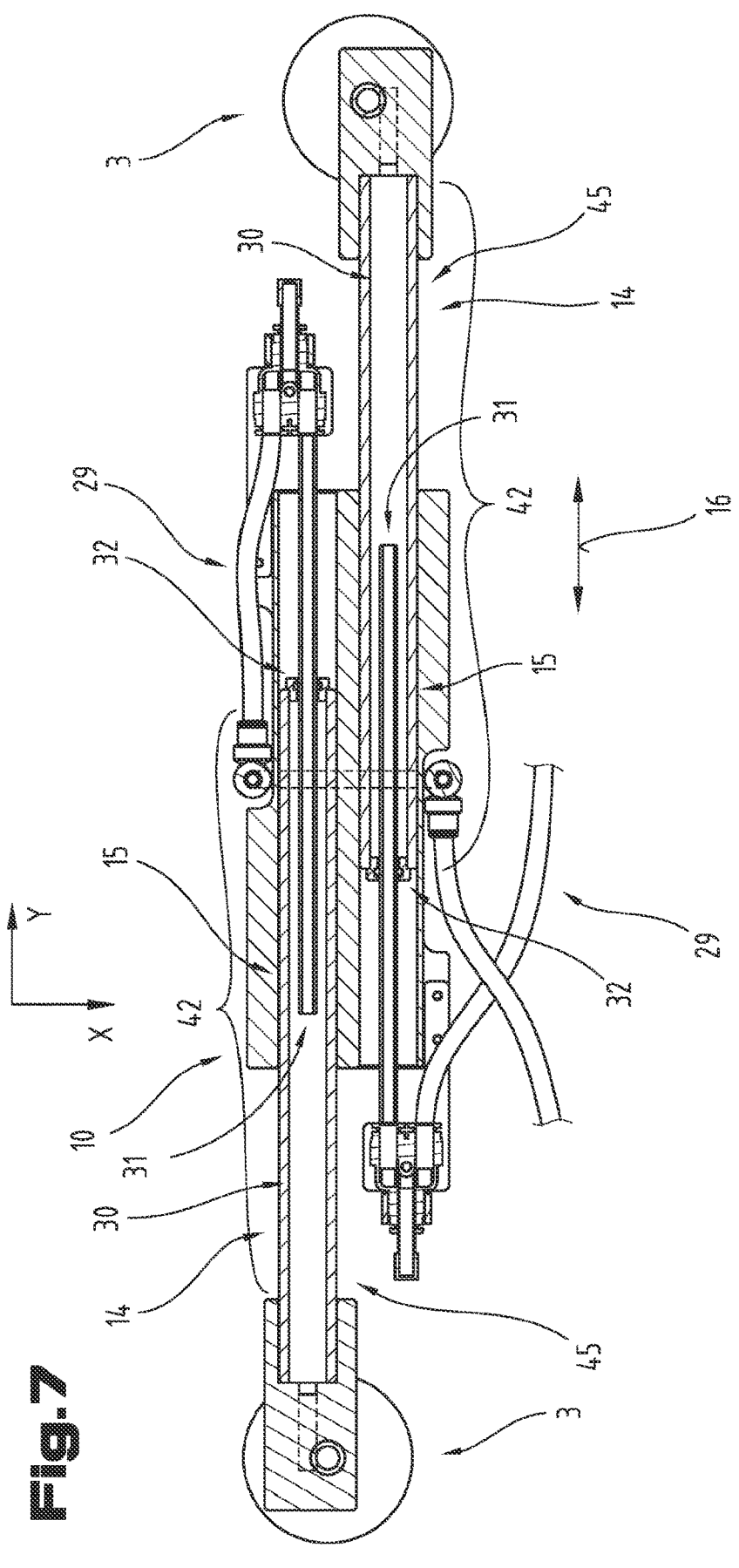
Figure 8:
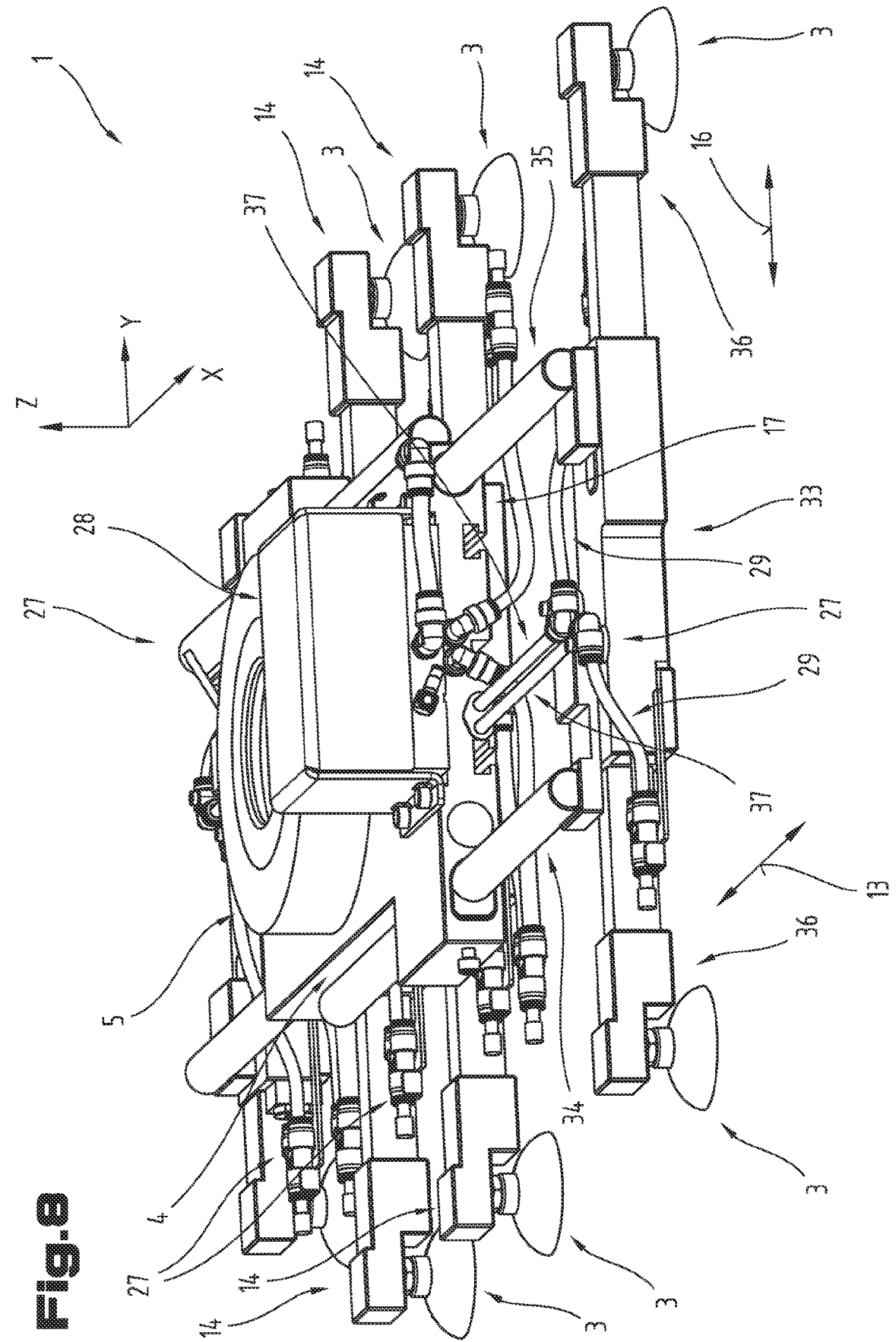
Figure 9:
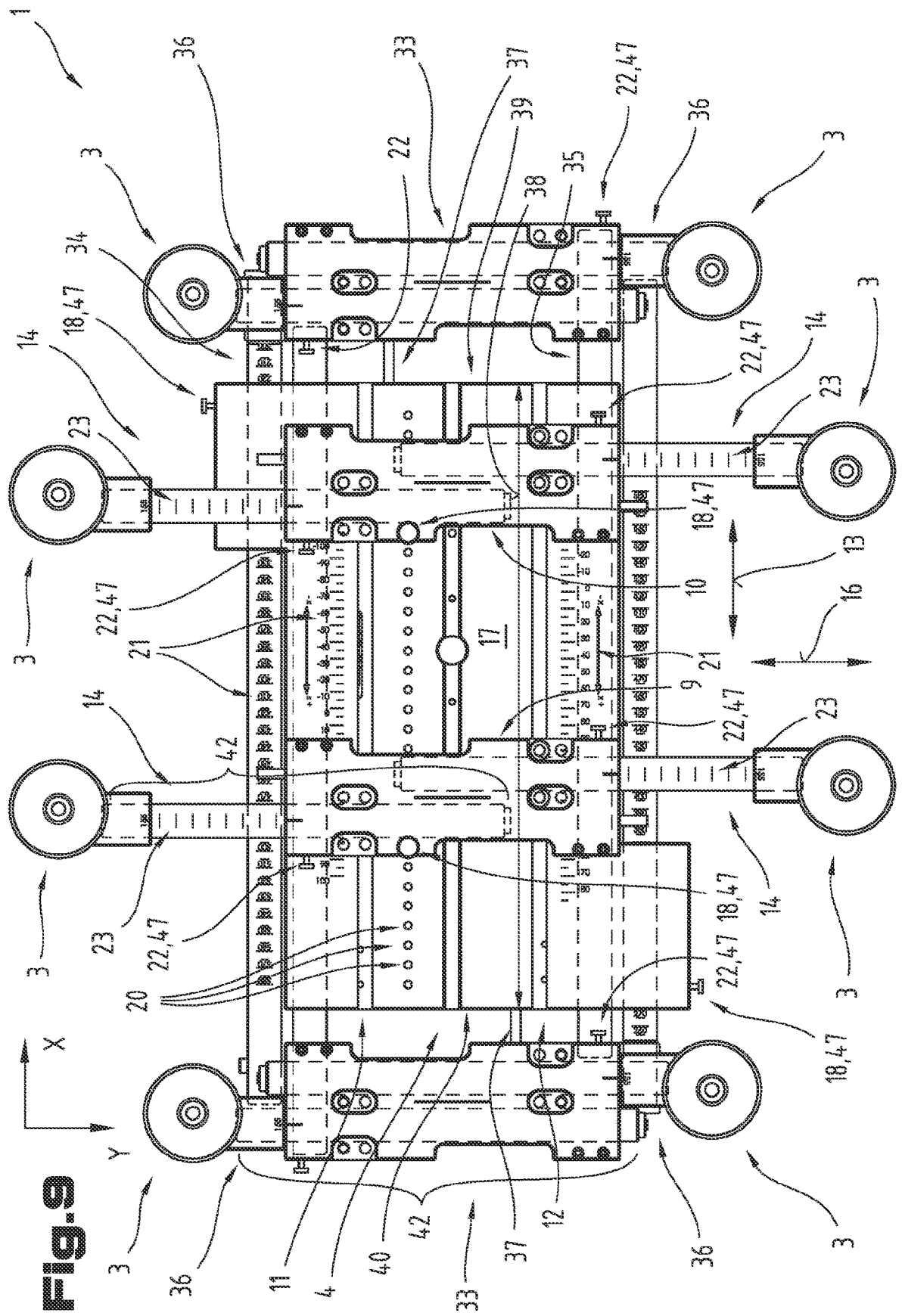
Figure 10:
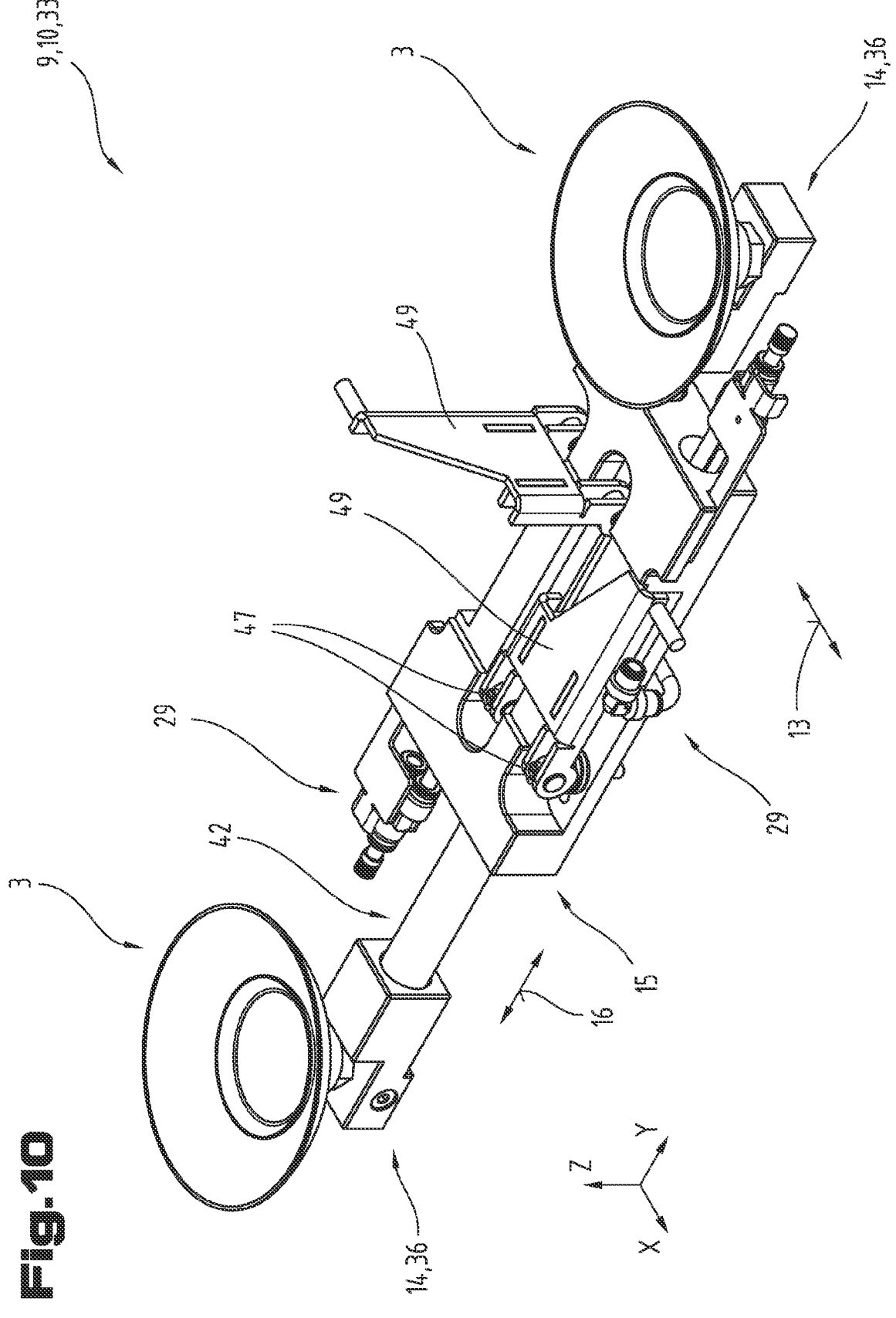
Figure 11:
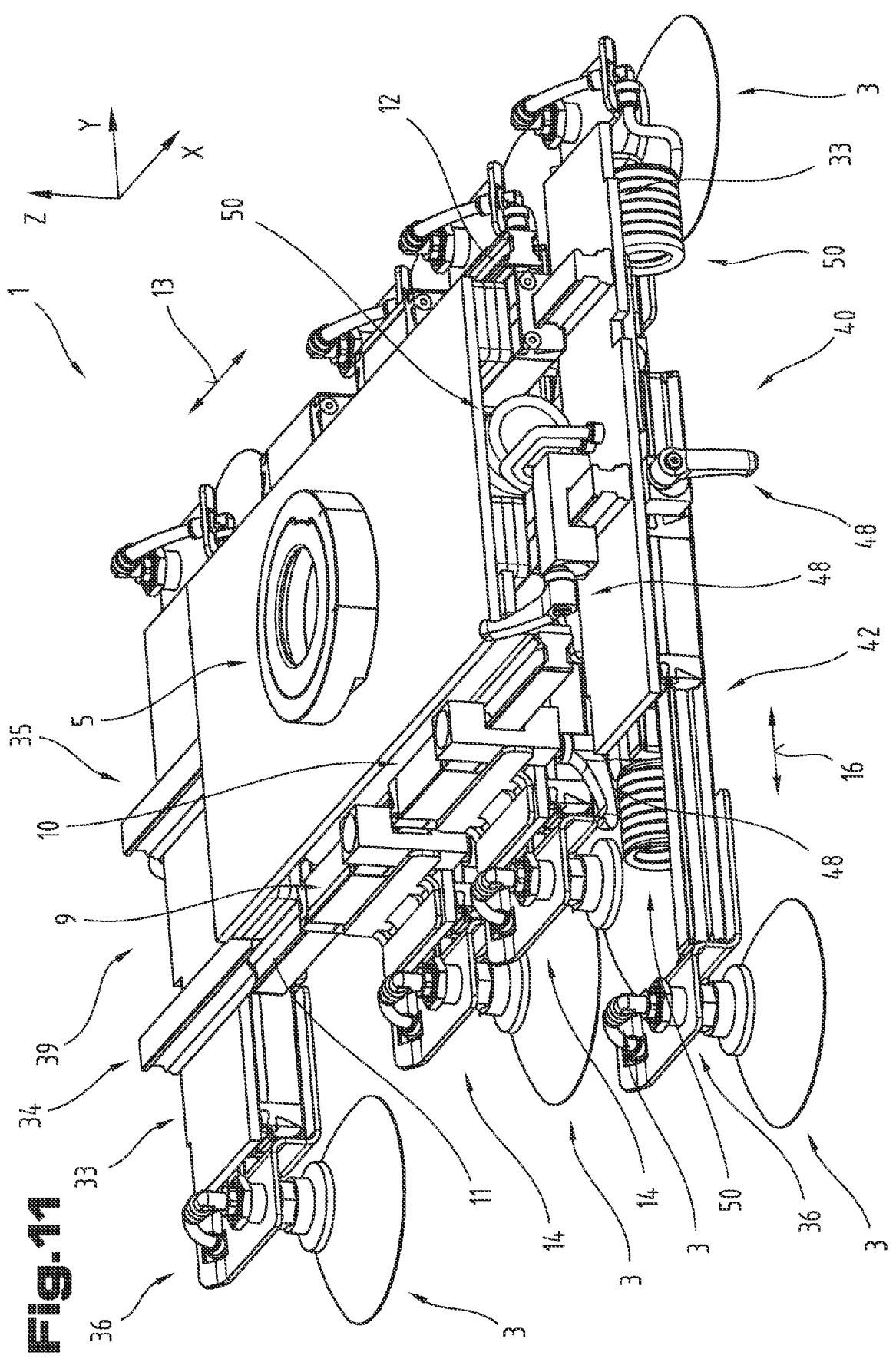
Figure 12:
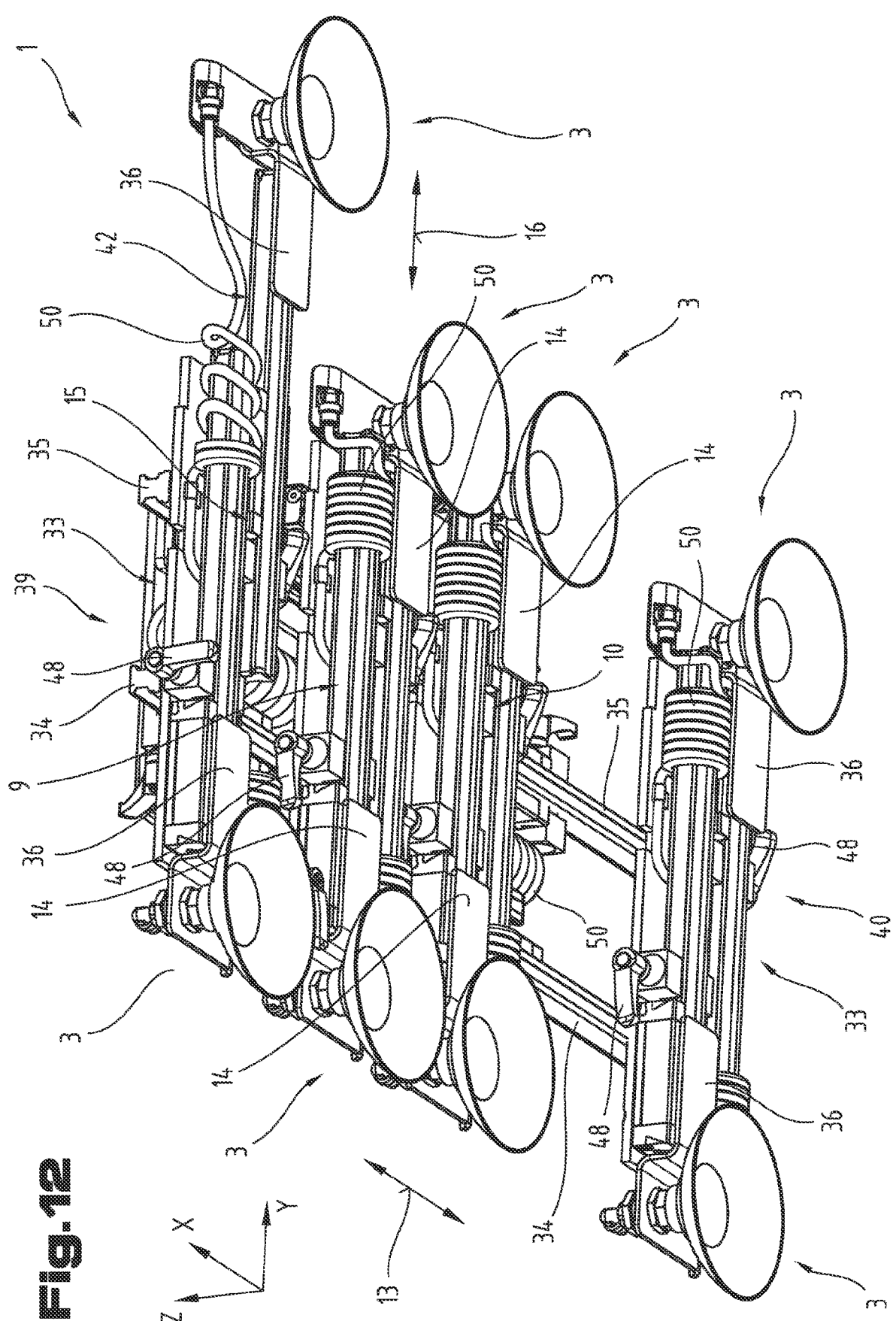
Figure 13:
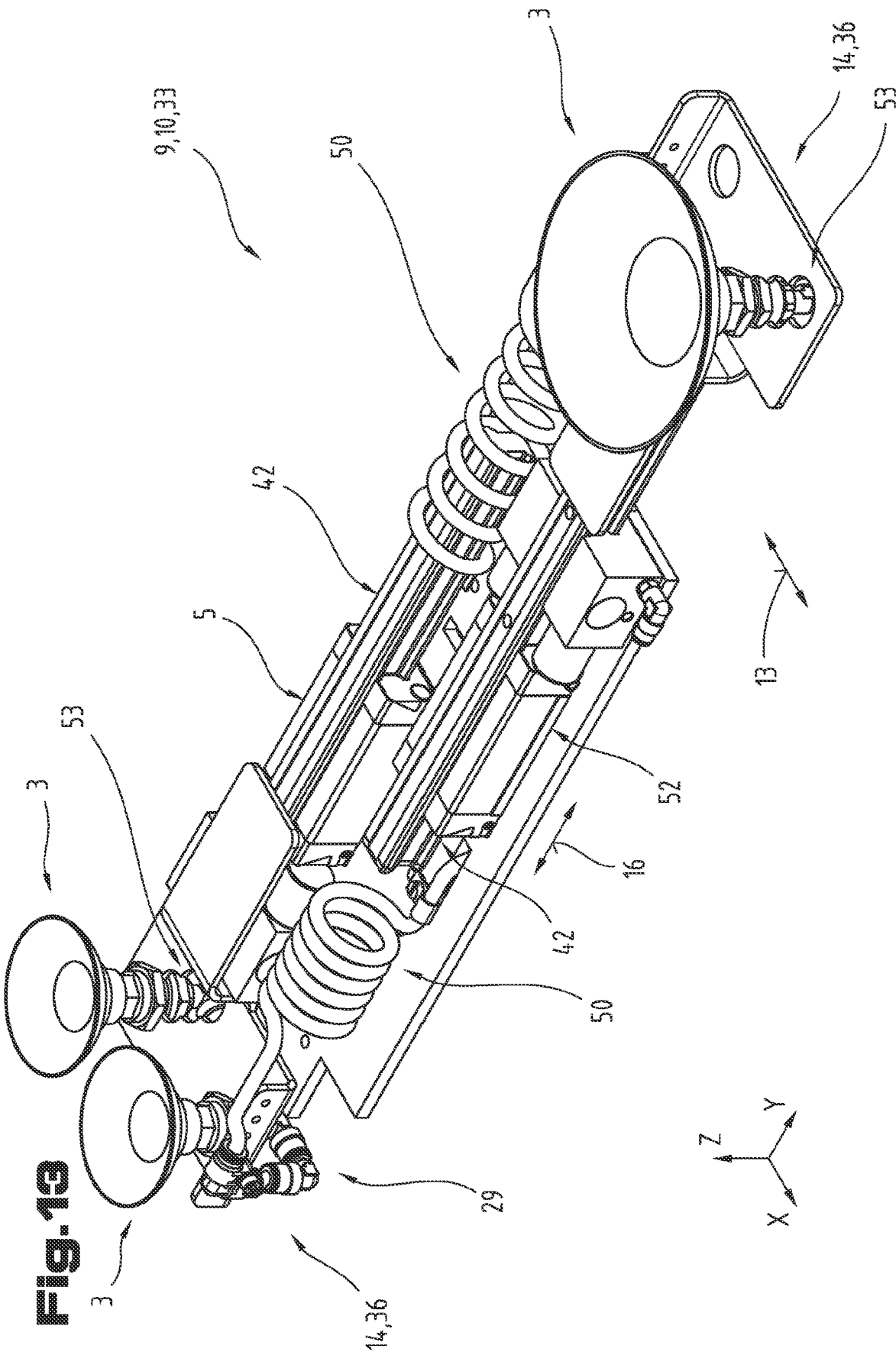
Figure 14:
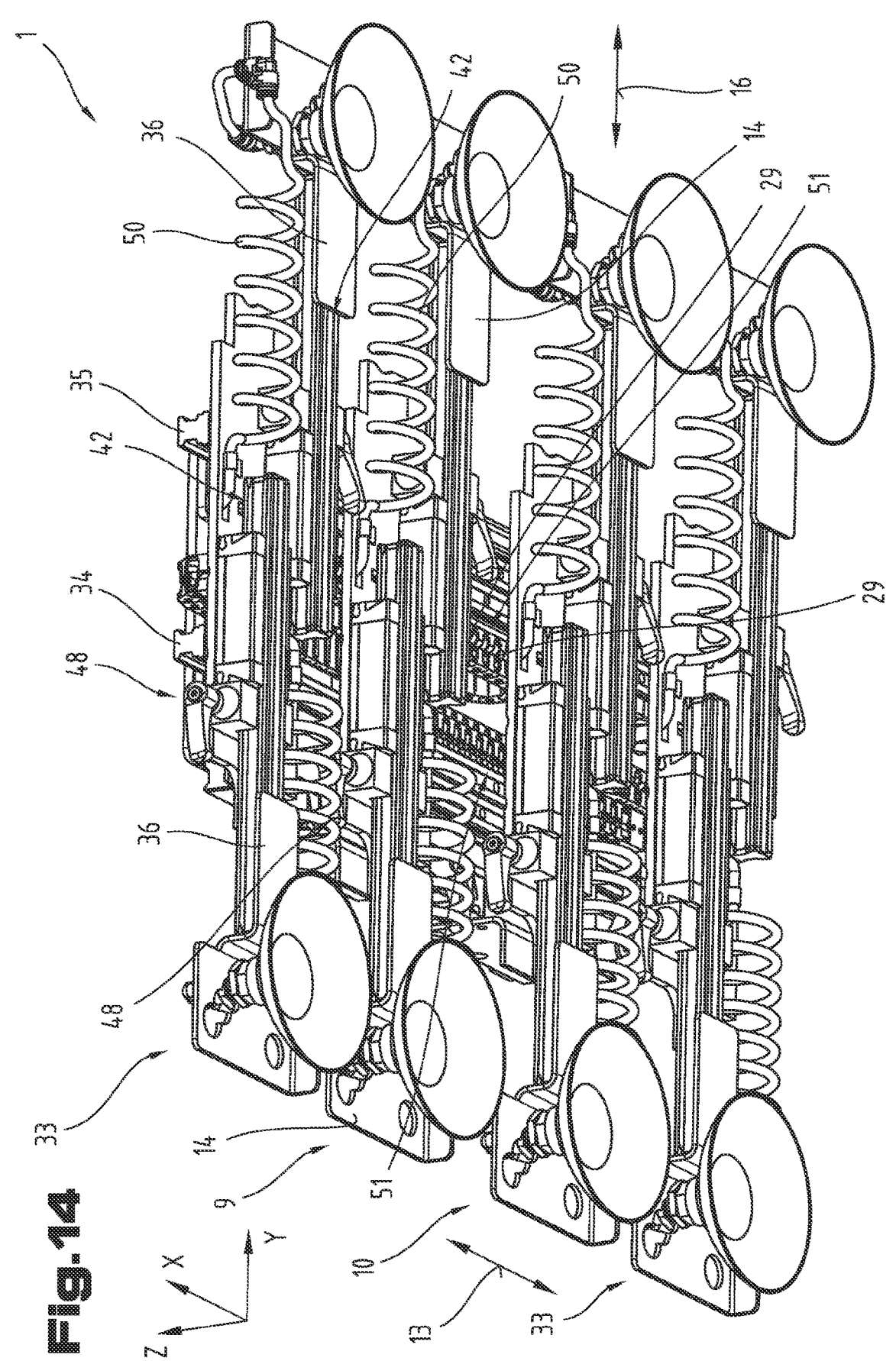

These show in a respectively very simplified schematic representation:

FIG. 1 a gripping device for manipulating workpieces during their processing with a processing machine in a three-dimensional view onto the top side;

FIG. 2 the gripping device in accordance with FIG. 1 in a three-dimensional view onto the bottom side;

FIG. 3 the gripping device in accordance with FIG. 1 in a view from below;

FIG. 4 a cross section of the supporting platform and of the adjustment slide in the area of the adjustment-slide snap-in means in accordance with FIG. 3;

FIG. 5 an alternative cross section of the supporting platform and of the adjustment slide in the area of the adjustment-slide snap-in means in accordance with FIG. 3;

FIG. 6 a detailed view of the gripping device in accordance with FIG. 2 with supply means in a three-dimensional view onto the bottom side;

FIG. 7 a longitudinal section through the transverse guide between the adjustment slide and the two transverse slides in accordance with FIG. 6;

FIG. 8 an alternative exemplary embodiment of the gripping device in a three-dimensional view onto the top side;

FIG. 9 the gripping device in accordance with FIG. 8 in a view from below;

FIG. 10 an adjustment slide with two transverse slides in a three-dimensional view;

FIG. 11 another exemplary embodiment of a gripping device in a three-dimensional view onto the top side;

FIG. 12 the gripping device in accordance with FIG. 11 in a three-dimensional view onto the bottom side;

FIG. 13 another adjustment slide with two transverse slides in a three-dimensional view;

FIG. 14 another exemplary embodiment of a gripping device in a three-dimensional view onto the bottom side.

First of all, it is to be noted that, in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, these specifications of location are to be analogously transferred to the new position.

The term "in particular" shall be understood below to mean that it can be a possible, more specified embodiment or narrower specification of an object, or of a method step, but need not necessarily represent an imperative, preferred embodiment of same, or an imperative procedure. In their present use, the terms "comprising," "comprises," "having," "includes," "including," "contains," "containing" and any variations of these shall cover a non-exclusive inclusion.

FIGS. 1, 2, and 3, as well as the sectional views of FIG. 3 shown in FIGS. 4 and 5, are described below essentially in a combination in order to avoid unnecessary repetitions. Here, equal reference numbers and/or equal component designations are used for equal parts.

FIGS. 1 to 5 show a gripping device 1 for manipulating, i.e. for transporting, and/or for receiving and discharging, handing over or placing down preferably plate-like workpieces 2 during their processing with a processing machine. To that end, the gripping device 1 comprises, as a central element, a supporting platform 4 for the retaining means 3 with a connection interface 5, with the help of which the gripping device 1 is affixable to an articulated arm 6, for example of a manipulator, in particular of a jointed-arm robot. The retaining means 3 are connected to the supporting platform 4 such that they are adjustable relative to the supporting platform 4.

The supporting platform 4 has a bottom side 17 and a top side 41 located opposite the bottom side 17. The connection interface 5 is configured on the top side 41 of the supporting platform 4 and for coupling the gripping device 1 with a manipulator. The connection interface 5 can be any known kind of coupling means. For example, a screw connection, or also bayonet connection, can be provided, but also flange connections are conceivable. In addition, it may also be that the gripping device 1 is arranged on a manipulator in a fixed, i.e. permanent and/or unreleasable, manner.

The gripping device 1 has multiple retaining means 3 for the direct contact with and/or for the direct affixing to the workpiece 2. The workpiece 2 is represented in FIG. 1 in a grossly schematic manner by means of dashed lines as a sheet-metal workpiece, by way of example. The retaining means 3 can be activated and/or deactivated, as required, by means of supply means 27 not represented in FIGS. 1 to 5 for the sake of simplicity, whereby the workpiece 2 can be received and/or placed down again. The retaining means 3 are coupled to the supporting platform 4 and have contact sides 7, which contact sides 7 face away from the bottom side 17 of the supporting platform 4 and which contact sides 7 tenter and/or define a joint, even-surface contact plane 8. The retaining means 3 represented are vacuum retaining means, each of which has a suction cup with a contact side 7 for the contact with a workpiece 2. A workpiece 2 received by activating the retaining means 3 can thus be supplied to a processing area of the processing machine.

The adjusting of the retaining means 3 relative to the supporting platform 4 enables the positions of the retaining means 3 to be changed such that they correspond, at least essentially, to the form and/or to the expansion of the workpiece 2 and/or to the surface the workpiece 2 to be seized. This means that, in case of a small workpiece 2, smaller relative distances of the retaining means 3 to one another are possible, whereas, in case of larger workpieces 2, accordingly larger relative distances are set.

The gripping device 1 has at least one first adjustment slide 9 and one second adjustment slide 10. Each of the two adjustment slides 9, 10 is displaceable along a first direction 13 on an adjustment-slide guide 11, 12 configured between the adjustment slides 9, 10 and the supporting platform 4. The at least two adjustment-slide guides 11, 12 are config-ured on the bottom side 17 of the supporting platform 4, to that end. Each of the at least two adjustment slides 9, 10 is at least partially received in at least one of the adjustment-slide guides 11, 12 and is slidable relative to the supporting platform 4 along a first direction 13 in the adjustment-slide guides 11, 12. At least one of the adjustment slides 9, 10 is configured having at least one transverse guide 15. In FIGS. 1 to 5, both adjustment slides 9, 10 are configured having respectively two parallel transverse guides 15. In FIGS. 1 to 5, a total of four transverse slides 14 are shown in addition, on each of which at least one of the retaining means 3 is arranged. In the exemplary embodiment shown, a single retaining means 3 is positioned on the end section of each transverse slide 14. The transverse slides 14 are at least partially received in the respective transverse guide 15. In addition, the transverse slides 14 are slidable, and/or dis-placeable and adjustable relative to the respective adjust-ment slide 9, 10 along a second direction 16 in these transverse guides 15. The first direction 13 and the second direction 16 are mutually orthogonal. In the figures, the first direction 13 is aligned along the x-axis and the second direction 16 is aligned along the y-axis.

The at least one and/or the four transverse slides 14 shown in FIGS. 1 to 5 are respectively configured with one guide section 42. The respective guide sections 42 are each received and/or slidably guided in one of the transverse guides 15 and are configured so as to be profiled, in particular hollow-profiled. The guide sections 42 are linearly extendable, and also linearly retractable again, in the trans-verse guides 15.

FIG. 2 shows the gripping device 1 in accordance with FIG. 1 in a perspective representation in a view from diagonally below, i.e. in a view onto the bottom side 17 of the supporting platform 4. FIG. 3 shows the gripping device 1 in accordance with FIGS. 1 and 2 in a view from below, i.e. also with a view onto the bottom side 17 of the supporting platform 4.

In accordance with the exemplary embodiment, the adjustment slides 9, 10 are configured with two parallel transverse guides 15 each, wherein one extendable trans-verse slide 14 is received in each transverse guide 15. Here, at least one of the retaining means 3 is arranged on each transverse slide 14, wherein the retaining means 3 are configured on end sections of the two transverse slides 14 facing away from each other. Also other retaining means 3 could be positioned on the supporting platform 4 directly, and therefore not slidably. Furthermore, it would also be conceivable that other retaining means 3 are positioned directly, and therefore slidably along the first direction 13, on one or two of the adjustment slides 9, 10. However, these advancements are not shown in the figures.

A transverse axis 43 oriented along the first direction 13 can be located equidistantly between the two parallel trans-verse guides 15. Retaining means 3 arranged on the two transverse slides 14 can be positioned such that they are located on the transverse axis 43 with their respective retaining-means center 44. This is visualized particularly illustratively in FIG. 3.

The adjustment slides 9, 10 can each be configured with an adjustment-slide fixing means in the form of an adjust-ment-slide snap-in means 18, which can be actuatable inde-pendent of one another and be configured for fixing the adjustment slides 9, 10 relative to the supporting platform 4, releasably as required. Alternatively or additionally, the adjustment slides 9, 10 can be configured with one or multiple transverse-slide fixing means in the form of trans-verse-slide snap-in means 22, which can be configured for fixing the at least one transverse slide 14 relative to the adjustment slide 9, 10, releasably as required. Particularly FIGS. 2 to 5 illustrate the snap-in means 18, 22. If the adjustment slides 9, 10 are configured with two transverse slides 14 each, it may be that these two transverse slides 14 are fixable simultaneously and/or jointly with a single trans-verse-slide snap-in means 22. Yet, it may also be that each transverse slide 14, as shown in FIG. 3, has its own transverse-slide snap-in means 22.

At least one first scale 21 can be configured on the supporting platform 4 along the first direction 13. In addi-tion, the supporting platform 4 can be configured with a plurality of snap-in recesses that are spaced equidistantly apart from one another along the first direction 13 and arranged in succession along the first direction 13. Preferably, the scale 21 and the snap-in recesses correlating with the scale 21 are arranged next to one another. Graduation marks of the scale 21 correspond to the positions of the snap-in holes 20. This facilitates the setting of the desired x-position for the retaining elements 3 along the first direction 13 for a user. This can be readily seen in particular in FIGS. 2 and 3. Here, two scales 21 that are differently marked and/or mutually offset by one width of the adjustment slide are installed on the bottom side 17 of the supporting platform 4. Direction indicators 46 facilitate a correct scale adjustment for a user. This is expedient in particular whenever the user is prescribed the required adjustment parameters by a computer program. Here, the scales 21 can start from a zero value, or they can also extend from a negative starting value to a positive end value, as can be seen in FIG. 3.

Both in FIG. 2 and in FIG. 3, it can be readily seen that the two adjustment slides 9, 10 are displaceable at the bottom side 17 of the supporting platform 4 in the first direction 13 with the help of adjustment-slide guides 11, 12 configured as linear guides. To that end, the adjustment-slide guides 11, 12 comprise prism tracks for a form-fitting engagement with sections of the two adjustment slides 9, 10. Alternatively to the T-shaped cross section of the adjustment-slide guides 11, 12 shown, these could also be formed by dovetail guides, for example. The sections that are engaged with the adjustment-slide guides 11, 12, can be sliding blocks, for example, or also rolling elements.

A snap-in element of the adjustment-slide snap-in means 18 can be engageable with the snap-in recesses of the supporting platform 4. Alternatively or additionally, a second scale 23 can be configured on the transverse slides 14 along the second direction 16. Also this can be illustratively gleaned from FIGS. 2 and 3. The transverse slides 14 can be configured with a plurality of snap-in recesses spaced equidistantly apart from one another along the second direction 16, wherein a snap-in element of the transverse-slide snap-in means 22 can be engageable with the snap-in recesses of the transverse slide 14. These snap-in recesses are arranged on the respective guide sections 42 of the transverse slides 14 and can be gleaned in particular from the representation in FIG. 2. The snap-in recesses of the supporting platform 4 and the snap-in recesses of the transverse slide 14 can respectively be configured as snap-in holes 20, 24.

As can be seen in FIGS. 2 and 3, the first scale 21 and the second scale 23 can be arranged so as to be parallel to the contact plane 8, so that they are visible when viewing the bottom side 17 of the supporting platform 4.

In particular FIGS. 4 and 5 illustrate one conceivable operating mechanism of a snap-in means 18, 22 on the basis of adjustment-slide snap-in means 18. Of course, the snap-in mechanism shown can be used not only for an adjustment-slide snap-in means 18 but also for a transverse-slide snap-in means 22. FIGS. 4 and 5 respectively show a section through the gripping device 1. Here, the cutting positions are marked with Roman numerals in FIG. 3. The snap-in element of the adjustment-slide snap-in means 18 shown in FIGS. 4 and 5 can be configured as a bolt 19. This bolt 19 can be engageable with the snap-in recesses of the supporting platform 4.

Analogously to what has been described for the positioning of the adjustment slides 9, 10 on the supporting platform 4, a snap-in means 22 and a scale 23 are respectively provided also for the positioning of the transverse slides 14 on the respective adjustment slides 9, 10. Accordingly, in the activated position, the snap-in means 22 engage with snap-in holes 24, which are configured on the transverse slides 14 (FIG. 2). The snap-in holes 24 of the transverse slides 14 are arranged on same respectively along the second direction 16 y-direction and equidistantly offset to one another. With the help of the snap-in means 22, the transverse slides 14 can be fixed on the respective adjustment slides 9, 10 in a corresponding number of snap-in positions. Here, the functioning of this second snap-in means 22 for positioning the transverse slides 14 on the respective adjustment slide 9, 10 can be configured in the same manner as has already been described above with reference to FIGS. 4 and 5 for the adjustment-slide snap-in means 18.

In accordance with the exemplary embodiment of FIG. 4, the snap-in means 18 can comprise a bolt 19 spring-loaded in axial direction, which is mounted in the adjustment slide 10. Here, an end of the bolt 19 facing the bottom side 17 of the supporting platform 4 reaches into one of a row of snap-in holes 20 configured in the supporting platform 4. The bolt 19, therefore, forms a latch with which the adjustment slide 10 is fixed on the supporting platform 4 against a sliding along the first direction 13. Here, the adjustment-slide snap-in means 18 is in its activated and/or snapped-in position. To adjust the adjustment slide 10, and therefore the retaining elements 3 connected to same, the adjustment-slide snap-in means 18 can be deactivated by a user pulling back the bolt 19 from its snapped-in position in the snap-in hole 20 and subsequently performing a sliding of the adjustment slide 10 towards the first direction 13. Once the desired position of the retaining means 3 and/or of the adjustment slide 10 is finally reached, the adjustment-slide snap-in means 18 is reactivated by the user letting go of the bolt 19, wherein the bolt 19 snaps into one of the other snap-in holes 20. Due to the spring load of the bolt 19, the adjustment-slide snap-in means 18 remains in its activated, snapped-in position. In accordance with this exemplary embodiment, the adjustment-slide snap-in means 18 is configured as a latch pawl acting in a form-fitting manner, wherein the bolt 19 functions as a latch. The snap-in holes 20 in the bottom side of the supporting platform 4 are lined up next to one another in equidistant distances along the first direction 13 (x-direction), as is also shown in FIGS. 2, 3.

FIG. 5 shows an alternative exemplary embodiment of the adjustment-slide snap-in means 18 and/or of the transverse-slide snap-in means 22. In this context, a cross section of the supporting platform 4 and of the adjustment slide 10 of the gripping device 1 as indicated in FIG. 3 is represented in FIG. 5. In accordance with this exemplary embodiment, a toothing and/or a rack 25 is configured in the bottom side 17 of the supporting platform 4, which toothing and/or rack 25 is aligned parallel to the first direction 13 and/or to the x-direction. In its activated position, the bolt 19 of the adjustment-slide snap-in means 18 engages with one of the tooth gaps 26 of the rack 25. In this manner, the adjustment slide 10 is fixed against a sliding in x-direction 13. In accordance with the oblique inclination of the tooth flanks of the rack 25, this exemplary embodiment represents a friction-fit fixing. Accordingly, the snap-in recesses of the supporting platform 4 can therefore be formed by a rack 25 with tooth gaps 26. Here, the bolt 19 is engageable with the tooth gaps 26 in an at least essentially complementary-shape manner Yet, it may also be that the snap-in recesses of the transverse slides 14 are formed by a rack 25 with tooth gaps 26. Particularly preferably, the guide section 42 of the transverse slides 14 can be configured as a rack 25.

On the basis of FIGS. 6 and 7 below, supply means 27 for activating and deactivating the retaining means 3 of the gripping device 1 are subsequently described. Here, it is provided that the gripping device 1 is a so-called vacuum gripper, wherein the retaining means 3 comprise suckers that are activatable and/or deactivatable via a corresponding line system. FIG. 6 shows a detail of the gripping device 1 with supply means 27 in accordance with FIG. 2, in a perspective representation. Using the example of the second adjustment slide 10, the sectional representation shown in FIG. 7 additionally also shows components of the supply means 27 of the retaining means 3. Expediently, the retaining means 3 is configured as a vacuum retaining means here.

Accordingly, the supply means 27 can comprise a vacuum supply module or aggregate (not shown in the figures), a valve island 28 and preferably flexible and/or tubular vacuum lines 29. The valve island 28 can advantageously be arranged on the top side 41 of the supporting platform 4. To that end, the guide section 42 of the at least one transverse slide 14 can be configured, at least in sections, with a hollow profile 45, as can be seen particularly in FIG. 7. This hollow profile 45 can form a vacuum canal 30, in which vacuum canal 30 a telescopable, and/or extendable and retractable vacuum pipe 31 can be arranged. The vacuum canal 30 can be flow-connected to the supply means 27 and to the at least one retaining means 3 arranged on the transverse slide 14. The vacuum canal 30 can longitudinally extend in the hollow profile 45 along the second direction 16 and be flow-connected to the retaining means 3 arranged on the transverse slide 14. In addition, the vacuum pipe 31 is positioned in the vacuum canal 30 along the second direction 16 so as to be slidable. The vacuum supply module is flow-connected to the one or multiple retaining means 3 via the valve island 28 by means of the vacuum lines 29 and the vacuum pipe 31. It may also be that the valve island 28 is flow-connected to the individual retaining means 3 by means of corresponding shut-off valves.

This flow connection to the vacuum supply of the retaining means 3 is illustrated in particular in FIG. 7. FIG. 7 shows a longitudinal section through the two transverse guides 15 between one of the two adjustment slides 10 and the two transverse slides 14 with a cutting plane parallel to the x-y-plane and/or parallel to the contact plane 8. The transverse slides 14 are each mounted, such that they can be adjusted and pushed out, in one of the two transverse guides 15 of the adjustment slide 10 in a direction aligned parallel to the second direction 16. As a part of the supply means 27 of the gripping device 1, a vacuum canal 30 is configured in the interior of each of the transverse slides 14. On the other hand, a vacuum pipe 31 connected to each of the adjustment slides 10 is configured, which vacuum pipe 31 protrudes into the interior of the vacuum canal 30. Here, a longitudinal direction of the vacuum canal 30, and also a longitudinal direction of the vacuum pipe 31, are aligned parallel to the push-out direction and/or to the second direction 16 of the respective transverse slide 14 in the adjustment slide 10, whereby the section of the line 29 thus formed can be pushed out and/or telescoped during an adjustment of the transverse slides 14. If required, a seal 32 is configured between the respective vacuum canal 30 of the transverse slide 14 and the associated vacuum pipe 31.

FIGS. 8 and 9 show another embodiment of the gripping device 1 that is optionally independent in itself, wherein the same reference numbers and/or the same component designations as in the preceding figures are used again. To avoid unnecessary repetitions, the detailed preceding description should be noted and/or is referred to.

In addition to the adjustment slides 9, 10 that are displaceably affixed to the bottom side 17 of the supporting platform 4 in accordance with FIGS. 1 and 2, two other adjustment slides 33, each of which is extendable at the front end of the supporting platform 4, are provided in this exemplary embodiment. To that end, these other adjustment slides 33 each comprise a first 34 and a second guide bar 35, which are aligned parallel to the first direction 13. On the front ends 39, 40 of the supporting platform 4, openings and/or bores for receiving the guide bars 34, 35 are configured. The two other adjustment slides 33 can be pushed out and/or linearly pulled out relative to the supporting platform 4 along the first direction 13 by means of the guide bars 34, 35.

In each of the two other adjustment slides 33, preferably two other transverse slides 36, corresponding to the second direction 16, for at least one other retaining means 3 each can be received such that they can be pushed out. Accordingly, also in case of the adjustment slides 33 that are extendable at the front end, the transverse slides 36 on the adjustment slide 33 are displaceable in the second direction 16 perpendicular to the first direction 13. In the same manner as in the adjustment slides 9, 10 connected to the bottom side of the supporting platform 4, it is provided also for the adjustment slide 33 extendable at the front end and/or the transverse slides 36 connected thereto that their position can be fixed, releasably as required, in one of a plurality of specified snap-in positions. To that end, snap-in means 18, 22 are configured between the supporting platform 4 and the guide bars 34, 35 of the adjustment slide 33, and also between each of the transverse slides 36 and the adjustment slide 33, as described above in relation to FIGS. 4 and 5 and not represented in FIG. 8. FIG. 9 shows that, when viewing the supporting platform 4 from the bottom side 17, also the guide bars 34, 35 can be configured with a scale 21 for indicating the adjustment position.

Parallel to the guide bars 34, 35, a vacuum pipe 37 can be configured, which vacuum pipe 37 is linearly extendable relative to the supporting platform 4. The vacuum pipe 37, as a component of the supply means 27, can be flow-connected to the at least one retaining means 3 arranged on the transverse slide 36 that is arranged on the other adjustment slide 33. Here, the supply means 27 can comprise another vacuum pipe 37, which can be arranged in another vacuum canal 30 in the preferably hollow-profiled guide bars 34. This variant is not shown in the figures. Alternatively, in accordance with FIGS. 8 and 9, the other vacuum pipe 37 can be arranged in the supporting platform 4 and parallel to the guide bars 34, 35. Preferably, the other vacuum pipe 37 is positioned between the two guide bars 34, 35, when viewing the supporting platform 4 from the bottom side 17. In addition, the other vacuum pipe 37 is affixed to the other adjustment slide 33, wherein the retaining means 3 arranged on the other transverse slide 36 is flow-connected to the valve island 28 and/or to a vacuum supply module by means of a preferably flexible-form vacuum line 29 and by means of the other vacuum pipe 37.

Alternatively but not shown in the figures, it can also be expedient if the other transverse slide 36 is configured with a vacuum pipe 31 that is slidable in a vacuum canal 30, as shown in FIG. 7, which vacuum pipe 31 flow-connects the retaining means 3 and the other vacuum pipe 37. This would ensure that the operating principle of the supply lines between the other adjustment slides 33 and the transverse slides 36 connected thereto is configurable in the same manner as has been described above in relation to FIG. 7.

FIG. 9 shows the gripping device 1 in accordance with the exemplary embodiment according to FIG. 8 in a view from below. For reasons of better clarity, some parts of the supply means 27 of the vacuum supply system for the retaining means 3 are not represented here. Like also already in the exemplary embodiment in accordance with FIGS. 1 to 5, the two adjustment slides 9, 10 are arranged on the bottom side 17 of the supporting platform 4. Here, they are connected to the supporting platform 4 with the help of the adjustment-slide guides 11, 12 and are slidable along the first direction 13 in these guides 11, 12. Here, they can be fixed, as required, in one of a plurality of snap-in positions with the help of the snap-in means 18 and/or with the help of the snap-in holes 20 in the bottom side 17 of the supporting platform 4. Further, the adjustment slides 9, 10 have transverse slides 14 along the second direction 16, which transverse slides 14 are extendable in opposite direction and have one retaining means 3 each. Between the adjustment slide 9, 10 and the transverse slide 14, the snap-in means 22 is configured in each case, whereby also the transverse slides 14 and/or their retaining means 3 can be fixed, as required, in one of a plurality of specified snap-in positions. To adjust the retaining means 3 and to locate the desired x and/or y-position, a user can orient themselves by the scales 21, 23, which are installed on the bottom side of the supporting platform 4 and/or on the transverse slides 14. Here, an area that is available for adjusting the adjustment slides 9, 10 on the supporting platform 4 extends along the first direction 13 over a length 38 of the supporting platform 4.

It may also be that the adjustment-slide fixing means and/or the transverse-slide fixing means are not configured as snap-in means 18, 22, but that they are fixable by means of screws 47. This variant is also illustrated in FIG. 9, wherein a fixing by means of screws 47 does generally not require snap-in holes 20. By means of the screws 47, a clamping force between one of the adjustment slides 9, 10 and the supporting platform 4 can be applicable, and/or a clamping force between the at least one transverse slide 14 and one of the adjustment slides 9, 10 can be applicable.

As already described in relation to FIG. 8, in accordance with this exemplary embodiment, the gripping device 1 comprises the other adjustment slide 33, in addition to the two adjustment slides 9, 10, on the bottom side 17 of the supporting platform 4, which other adjustment slide 33 is extendable at the front end of the supporting platform 4 in accordance with the first direction 13 by means of its two guide bars 34, 35. Here, the guide bars 34, 35 of the adjustment slide 33 are aligned parallel to the adjustment-slide guides 11, 12 of the adjustment slides 9, 10 at the bottom side 17 of the supporting platform 4. This means that the direction of the adjustment is the same as that of the adjustment slides 9, 10, namely the first direction 13 (x-direction). As represented in FIG. 9, in accordance with this exemplary embodiment, the gripping device 1 comprises the other adjustment slide 33 both on a first front end 39 and on a second front end 40. The adjustment slides 33 are each configured with two transverse slides 36 extendable in opposite direction, wherein the transverse slides 36 are each guided with their guide sections 42 in the adjustment slides 33. Snap-in means 22 are provided, again, for fixing the transverse slides 36 relative to the adjustment slides 33 as required. On the other hand, a snap-in means 18 is also provided between the guide bar 34 of the adjustment slide 33 and the supporting platform 4. In this case, a scale 21 is installed on the guide bar 34 to locate the desired position in x-direction. Just like the transverse slides 14, also the other transverse slides 36 comprise a scale 23. The arrangement of the snap-in means 18, 22, and also of the scales 21, 23, in the manner shown in FIG. 9 has the advantage for a user that the position adjustments of the retaining means 3 can be carried out in a single position, namely viewing onto the bottom side 17 of the supporting platform 4.

FIG. 10 shows an exemplary embodiment of an adjustment slide 9, 10, 33 with two extendable transverse slides 14, 36. Here, the guide sections 42 of the transverse slides 14, 36 are received in the two transverse guides 15. The guide sections 42 are profiled and linearly extendable along the second direction 16 in the transverse guides 15. To avoid unnecessary repetitions, reference is made to the description of the preceding figures, also in this case.

The adjustment slide 9, 10, 33 is configured with two transverse-slide fixing means for fixing the two transverse slides 14 relative to the adjustment slide 9, 10, releasably as required. Here, the transverse-slide fixing means are each configured with two screws 47, wherein a clamping force between transverse slides 14, 36 and adjustment slides 9, 10, 33 is applicable by means of the screws 47. In addition, the transverse-slide fixing means each comprise a cam lever 49, which is connected to the two screws 47 in an articulated manner. In FIG. 10, the transverse slide 14, 36 represented on the left is shown in its extended state, the right transverse slide 14, 36 in its completely retracted state. The cam lever 49 of the left transverse slide 14, 36 is closed and the transverse-slide fixing means is therefore fixed. The cam lever 49 of the right transverse slide 14, 36 is shown open and/or opened. An adjusting and/or linear sliding of the right transverse slide 14, 36 and/or its guide section 42 is possible in this released and/or unfixed state.

It should be understood that the transverse-slide fixing means shown can also be configured in the same, or a similar, manner as adjustment-slide fixing means for fixing the adjustment slides 9, 10 relative to the supporting platform 4, releasably as required.

FIGS. 11 and 12 show two three-dimensional views of another exemplary embodiment of a gripping device 1. Here, the perspective corresponds approximately to that of FIGS. 1 and 2. Also with regard to the description of FIGS. 11 and 12, reference is made to the preceding passages of the description in order to avoid unnecessary repetitions.

The gripping device 1 comprises, by way of example, a total of four adjustment slides 9, 10, 33. Here, as shown, each of the two middle adjustment slides 9, 10 can be received at least partially in at least one of the adjustment-slide guides 11, 12. Specifically, the two middle adjustment slides 9, 10, in accordance with the example, are guided at the two longitudinal sides of the supporting platform 4 in grooves of profiled guide rails. To increase the stability and smooth running, each of the two middle adjustment slides 9, 10 is guided in grooves at the bottom and top sides of the two adjustment-slide guides 11, 12 configured as profiled guide rails. The two middle adjustment slides 9, 10 are slidable relative to the supporting platform 4 along a first direction 13 in the adjustment-slide guides 11, 12. Any and all adjustment slides 9, 10, 33 comprise respectively two linearly slidable and/or extendable transverse slides 14, 36. Each of the transverse slides 14, 36 has respectively one retaining means 3 on its end section. Here, the retaining means 3 are affixed to the respective transverse slide 14, 36 by means of a bent sheet-metal component. Due to the angle shape, it can be ensured that the retaining means 3 contribute as little as possible to the overall thickness and/or overall height of the gripping device 1 and that no undesired interfering contours are formed.

The two exterior, other adjustment slides 33 each comprise—similarly to FIG. 8—a first 34 and a second guide bar 35, which guide bars 34, 35 are slidable along the first direction 13 and which guide bars 34, 35 are in particular guided through prism or profile tracks in the supporting platform 4. The two exterior adjustment slides 33 are linearly extendable relative to the supporting platform 4 along the first direction 13 by means of the guide bars 34, 35.

The adjustment slides 9, 10, 33 are each configured with an adjustment-slide fixing means, which adjustment-slide fixing means are actuatable independently and which are configured for fixing the adjustment slides 9, 10, 33 relative to the supporting platform 4, releasably as required. In addition, the adjustment slides 9, 10, 33 are configured with transverse-slide fixing means, which are configured for fixing the transverse slides 14, 36 relative to the adjustment slides 9, 10, 33, releasably as required. The adjustment-slide fixing means, and also the transverse-slide fixing means, are each configured with a clamping lever 48. By means of the clamping lever 48, a clamping force between adjustment slides 9, 10, 33 and supporting platform 4, in particular between adjustment slides 9, 10, 33 and adjustment-slide guides 11, 12, as well as between adjustment slides 9, 10, 33 and guide bars 34, 35 is applicable. In addition, a clamping force between transverse slides 14, 36 and one of the adjustment slides 9, 10 is applicable. FIG. 11 shows almost all clamping levers 48 in their fixed state. Merely the clamping lever 48 of the one exterior transverse slide 36 shown in its extended state is represented as opened, whereby a sliding and/or adjusting is possible.

FIGS. 11 and 12 also show that spiral and/or coiled and flexible-form supply lines 50 can be configured. The spiral supply lines 50 for supplying the retaining means 3 arranged on the transverse slides 14, 36 can be filled, at least in sections, by the respective guide section 42 of the respective transverse slide 14, 36. Yet, it may also be that an adjustment slide 9, 10, 33, in accordance with the example in FIG. 12, has at least two transverse slides 14, 36 that are parallel to each other and slidable relative to each other and that the spiral supply line 50 is filled, at least in sections, by the guide section 42 of the respective adjacent and/or parallel transverse slide 14, 36. In both variants mentioned, the spiral supply line 50 can stretch and/or expand during the linear extending or pushing-out.

Furthermore, also spiral supply lines 50 which are filled, at least in sections, by at least one of the guide bars 34, 35 of the adjustment slides 9, 10, 33 can be provided, or it may also be that—as shown in the figures—spiral supply lines 50 are arranged between the two guide bars 34, 35.

FIG. 13 shows another adjustment slide 9, 10, 33 with two transverse slides 14, 36 in a three-dimensional view. To avoid unnecessary repetition, reference is made to the preceding passages of the description, in particular to the description of FIG. 10, also in this case. To position the retaining means 3, multiple positioning openings 53 are provided on each of the transverse slides 14, 36 here, in which positioning openings 53 the retaining means 3 can be affixed. The retaining means 3 can thus be adapted as required to the respective workpiece geometry of the workpiece 2 to be manipulated. Furthermore, also multiple retaining means 3, and optionally also retaining means 3 of different sizes, can be positioned. FIG. 13 also shows that the transverse-slide fixing means can comprise pneumatic fixing means 52. Of course, also the adjustment-slide fixing means can comprise a pneumatic fixing means 52. Here, it is provided, in accordance with the example, that spiral supply lines 50 are configured and are provided for supplying the retaining means 3 with a vacuum. Advantageously, the spiral supply lines 50 can also serve to supply the pneumatic fixing means 52. The spiral supply lines 50 are each filled by the guide section 42 of the transverse slides 14, 36.

FIG. 14—with reference to the representation of FIG. 12—shows another exemplary embodiment of a gripping device 1 in a three-dimensional view. Also in this case, to avoid unnecessary repetition, the above passages of the description, in particular the description of FIG. 12, should be noted and/or are referred to, again. In particular, FIG. 14 shows an embodiment, according to which movably-mounted energy chains 51 are configured along the first direction 13. Here, the energy chains 51 can be arranged on the supporting platform 4. These energy chains 51 are configured for sliding the adjustment slides 9, 10 and for sliding the guide bars 34, 35. In the energy chains 51, one or multiple vacuum lines 29 are guided. These vacuum lines 29 are flow-coupled, again, to the spiral supply lines 50 filling the guide sections 42 of the transverse slides 14, 36. In contrast to that, it is represented in FIGS. 11 and 12 that, to supply the transverse slides 14, 36 and/or the retaining means 3 with a vacuum, spiral supply lines 50 can be arranged on the supporting platform 4. These spiral supply lines 50 are flow-coupled, again, to the spiral supply lines 50 filling the guide sections 42 of the transverse slides 14, 36.

The exemplary embodiments show possible embodiment variants, wherein it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

Any and all specifications of value ranges in the description at issue are to be understood to comprise any and all sub-ranges of same, for example the specification 1 to 10 is to be understood to mean that any and all sub-ranges starting from the lower limit 1 and from the upper limit 10 are comprised therein, i.e. any and all sub-ranges start at a lower limit of 1 or larger and end at on upper limit of 10 or less, e.g. 1 to 1.7, or 3.2 to 8.1, or 5.5 to 10.

Finally, as a matter of form, it should be noted that for ease of understanding of the structure, elements are partially not depicted to scale and/or are enlarged and/or are reduced in size.

| Table of reference numbers | |
|---|---|
| 1 | gripping device |
| 2 | workpiece |
| 3 | retaining means |
| 4 | supporting platform |
| 5 | connection interface |
| 6 | articulated arm |
| 7 | contact side |
| 8 | contact plane |
| 9 | adjustment slide |
| 10 | adjustment slide |
| 11 | adjustment-slide guide |
| 12 | adjustment-slide guide |
| 13 | first direction (x-direction) |

-continued

| Table of reference numbers | |
|---|---|
| 14 | transverse slide |
| 15 | transverse guide |
| 16 | second direction (y-direction) |
| 17 | bottom side |
| 18 | adjustment-slide snap-in means |
| 19 | bolt |
| 20 | snap-in hole |
| 21 | first scale |
| 22 | transverse-slide snap-in means |
| 23 | second scale |
| 24 | snap-in hole |
| 25 | rack |
| 26 | tooth gap |
| 27 | supply means |
| 28 | valve island |
| 29 | vacuum line |
| 30 | vacuum canal |
| 31 | vacuum pipe |
| 32 | seal |
| 33 | other adjustment slide |
| 34 | guide bar |
| 35 | guide bar |
| 36 | other transverse slide |
| 37 | vacuum pipe |
| 38 | length |
| 39 | front end |
| 40 | front end |
| 41 | top side |
| 42 | guide section |
| 43 | transverse axis |
| 44 | retaining-means center |
| 45 | hollow profile |
| 46 | direction indicator |
| 47 | screw |
| 48 | clamping lever |
| 49 | cam lever |
| 50 | spiral supply line |
| 51 | energy chain |
| 52 | pneumatic fixing means |
| 53 | positioning opening |

The invention claimed is:

1. A gripping device (1), which is configured for receiving a workpiece (2) to be transported, and for releasing the workpiece (2) again, comprising:

a supporting platform (4) with a bottom side (17) and a top side (41) located opposite the bottom side (17), wherein the supporting platform (4) is configured, on the top side (41), with a connection interface (5), or can be coupled to a connection interface (5), wherein the connection interface (5) is configured for coupling the gripping device (1) to a manipulator, and a plurality of retaining means (3), wherein the retaining means (3) are configured for retaining the workpiece (2), herein the retaining means (3) are coupled to the supporting platform (4), and wherein the retaining means (3) have contact sides (7), wherein the contact sides (7) face away from the bottom side (17) of the supporting platform (4), and wherein the contact sides (7) tenter a joint contact plane (8), supply means (27), wherein the supply means (27) are configured for activating and deactivating the retaining means (3), wherein the supporting platform (4) is configured, on the bottom side (17), with at least two adjustment-slide guides (11, 12), and wherein at least two adjustment slides (9, 10) are configured, wherein the adjustment slides (9, 10) are each at least partially received or supported in at least one of the adjustment-slide guides (11, 12), and wherein the adjustment slides (9, 10) are slidable relative to the supporting platform (4) along a first direction (13) in the adjustment-slide guides (11, 12), wherein at least one of the adjustment slides (9, 10) is configured with at least one transverse guide (15), and wherein at least one transverse slide (14) is configured, so that on the transverse slide (14) at least one of the retaining means (3) is arranged, and so that the transverse slide (14) is at least partially received or supported in the transverse guide (15), and so that the transverse slide (14) is slidable relative to the adjustment slide (9, 10) along a second direction (16) in the transverse guide (15), wherein the first direction (13) and the second direction (16) are mutually orthogonal, and wherein a guide section (42) of the at least one transverse slide (14), wherein the guide section (42) is received or supported in the at least one transverse guide (15), is profiled, and wherein this guide section (42) is linearly extendable in the transverse guide (15).

2. The gripping device (1) according to claim 1, wherein at least one of the adjustment slides (9, 10) is configured with two parallel transverse guides (15), and wherein an extendable transverse slide (14) is received in each transverse guide (15), wherein at least one of the retaining means (3) is arranged on each transverse slide (14), and wherein the retaining means (3) are configured on end sections of the two transverse slides (14), which end sections face away from each other.

3. The gripping device (1) according to claim 1, wherein the adjustment slides (9, 10) are each configured with an adjustment-slide fixing means, which adjustment-slide fixing means are actuatable independently, and which adjustment-slide fixing means are configured for fixing the adjustment slides (9, 10) relative to the supporting platform (4), releasably as required, and/or wherein the adjustment slides (9, 10) are configured with a transverse-slide fixing means, which transverse-slide fixing means is configured for fixing the at least one transverse slide (14) relative to the adjustment slide (9, 10).

4. The gripping device (1) according to claim 1, wherein at least one first scale (21) is configured on the supporting platform (4) along the first direction (13) and/or wherein a second scale (23) is configured on the at least one transverse slide (14) along the second direction (16).

5. The gripping device (1) according to claim 3, wherein the adjustment-slide fixing means is configured as an adjustment-slide snap-in means (18), and/or wherein the transverse-slide fixing means is configured as a transverse-slide snap-in means (22), and wherein the supporting platform (4) is configured with a plurality of snap-in recesses spaced equidistantly apart from one another along the first direction (13), and wherein a snap-in element of the adjustment-slide snap-in means (18) is engageable with the snap-in recesses of the supporting platform (4), and wherein the transverse slide (14) is configured with a plurality of snap-in recesses spaced equidistantly apart from one another along the second direction (16) and wherein a snap-in element of the transverse-slide snap-in means (22) is engageable with the snap-in recesses of the transverse slide (14).

6. The gripping device (1) according to claim 5, wherein the snap-in element of the adjustment-slide snap-in means (18) and/or the snap-in element of the transverse-slide snap-in means (22) is configured as a bolt (19), which bolt (19) is engageable with the snap-in recesses of the supporting platform (4) and/or with the snap-in recesses of the transverse slide (14).

7. The gripping device (1) according to claim 3, wherein the adjustment-slide fixing means comprises at least one screw (47), wherein a clamping force between one of the adjustment slides (9, 10) and the supporting platform (4) is applicable by means of the screw (47), and/or wherein the transverse-slide fixing means comprises at least one screw (47), wherein a clamping force between the at least one transverse slide (14) and one of the adjustment slides (9, 10) is applicable by means of the screw (47).

8. The gripping device (1) according to claim 3, wherein the adjustment-slide fixing means comprises at least one clamping lever (48), cam lever (49) or tension lever, wherein a clamping force between one of the adjustment slides (9, 10) and the supporting platform (4) is applicable by means of the clamping lever (48), cam lever (49) or tension lever, and/or wherein the transverse-slide fixing means comprises at least one clamping lever (48), cam lever (49) or tension lever, wherein a clamping force between the at least one transverse slide (14) and one of the adjustment slides (9, 10) is applicable by means of the clamping lever (48), cam lever (49) or tension lever.

9. The gripping device (1) according to claim 3, wherein the adjustment-slide fixing means and/or the transverse-slide fixing means comprises a pneumatic fixing means (52).

10. The gripping device (1) according to claim 1, wherein the adjustment-slide guides (11, 12) are configured as prism tracks for the form-fitting engagement with sections of the adjustment slides (9, 10).

11. The gripping device (1) according to claim 1, wherein the guide section (42) of the at least one transverse slide (14) is configured, at least in sections, with a hollow profile (45), which hollow profile (45) is configured as a vacuum canal (30), wherein the vacuum canal (30) is flow-connected to the supply means (27) and to the at least one retaining means (3) arranged on the transverse slide (14).

12. The gripping device (1) according to claim 1, wherein at least one spiral supply line (50) is configured, which at least one spiral supply line (50) is provided to apply a vacuum to at least one of the retaining means (3).

13. The gripping device (1) according to claim 12, wherein the at least one spiral supply line (50) is filled, at least in sections, by the guide section (42) of the at least one transverse slide (14).

14. The gripping device (1) according to claim 1, wherein the supply means (27) comprise a valve island (28), which valve island (28) is flow-connected to the retaining means (3) by means of shut-off valves.

15. The gripping device (1) according to claim 1, further comprising another adjustment slide (33) comprising a first guide bar (34) and a second guide bar (35), wherein the guide bars (34, 35) are slidable along the first direction (13), wherein the adjustment slide (33) is linearly extendable relative to the supporting platform (4) along the first direction (13) by the guide bars (34, 35).

16. The gripping device (1) according to claim 15, wherein at least one other transverse slide (36) is configured, wherein at least one of the retaining means (3) is arranged on the at least one other transverse slide (36), and wherein the at least one other transverse slide (36) is at least partially received in a transverse guide (15) of the other adjustment slide (33), and wherein the at least one other transverse slide (36) is slidable relative to the adjustment slide (33) along the second direction (16) in the transverse guide (15), wherein a guide section (42) of the other adjustment slide (33), wherein the guide section (42) is received in the at least one transverse guide (15), is profiled, and wherein the guide section (42) is linearly extendable in the transverse guide (15).

17. The gripping device (1) according to claim 15, wherein the at least one spiral supply line (50) is filled, at least in sections, by at least one of the guide bars (34, 35) of the adjustment slides (9, 10) or wherein the at least one spiral supply line (50) is arranged between the two guide bars (34, 35).

18. The gripping device (1) according to claim 1, wherein at least one energy chain (51) mounted so as to be movable along the first direction (13) is configured, which energy chain (51) is configured for sliding the adjustment slides (9, 10) and/or for sliding the guide bars (34, 35), and wherein at least one vacuum line (29) is guided in the energy chain (51).

19. A manipulator, which is configured for receiving a workpiece (2) to be transported, and for releasing it the workpiece again, comprising a gripping device (1), wherein the gripping device (1) is configured according to claim 1.

* * * * *